United States Patent [19]

Asai

[11] Patent Number: 5,610,736
[45] Date of Patent: Mar. 11, 1997

[54] ACTIVE MATRIX TYPE DISPLAY DEVICE IN WHICH ELONGATED ELECTRODES UNDERLIE THE SIGNAL LINES TO FORM CAPACITORS WITH THE PIXEL ELECTRODES AND MANUFACTURING METHOD

[75] Inventor: Yoshihiro Asai, Kanagawa-ken, Japan

[73] Assignee: Kabushiki Kaisha Toshiba, Kanagawa-ken, Japan

[21] Appl. No.: 363,219

[22] Filed: Dec. 23, 1994

[30] Foreign Application Priority Data

Dec. 24, 1993 [JP] Japan .................................. 5-327291
Dec. 13, 1994 [JP] Japan .................................. 6-308633

[51] Int. Cl.⁶ .................... G02F 1/136; G02F 1/1333; G02F 1/1343; G02F 1/13
[52] U.S. Cl. ............... 349/42; 437/40; 349/47; 349/110; 349/139; 349/187
[58] Field of Search .............. 437/40 TFT, 181; 148/DIG. 137; 359/59, 54, 58, 60, 67, 68, 87

[56] References Cited

U.S. PATENT DOCUMENTS

| 5,339,181 | 8/1994 | Kim et al. ................................ 359/54 |
| 5,358,809 | 10/1994 | Van Berkel ............................... 430/6 |
| 5,446,562 | 8/1995 | Sato ........................................ 359/67 |
| 5,459,596 | 10/1995 | Ueda et al. ............................... 359/54 |

FOREIGN PATENT DOCUMENTS

| 53-020896 | 2/1978 | Japan ....................................... 359/87 |
| 1-291219 | 11/1989 | Japan . |
| 3-196020 | 8/1991 | Japan . |
| 4-104227 | 4/1992 | Japan . |
| 5-66420 | 3/1993 | Japan . |
| 5-127195 | 5/1993 | Japan . |
| 5-203994 | 8/1993 | Japan . |
| 5-265032 | 10/1993 | Japan . |

OTHER PUBLICATIONS

T. Ueda et al., "High–Aperture–Ratio TFT–LCD with a Shield–Electrode Structure", SID 93 Digest, Toshiba R&D Center, Kawasaki, Japan, pp. 739–742.

T. Kitazawa et al., "A 9.5–in. TFT–LCD with an Ultra-–High–Aperture–Ratio Pixel Structure", SID Conference Record, Oct. 10–13, 1994, Toshiba Corp., Yokohama, Japan, pp. 365–368.

Primary Examiner—Anita Pellman Gross
Assistant Examiner—Walter J. Malinowski
Attorney, Agent, or Firm—Finnegan, Henderson, Farabow, Garrett & Dunner, L.L.P.

[57] ABSTRACT

An active matrix type display device including a plurality of thin film transistors disposed at crossing points of a plurality of scanning lines and a plurality of signal lines, and serving as switching elements for controlling pixels of the display device. Each pixel has a elongated electrode extending in overlapped relation with signal line. A dielectric layer, composed of the same layer as a gate insulating layer and a semiconductor layer, which is the same layer as the active layer of a thin film transistor, is interposed between the signal line and the elongated electrode, and a part of the elongated electrode serves as a electrode of a storage capacitor which is electrically coupled with the pixel.

23 Claims, 16 Drawing Sheets

ACTIVE MATRIX TYPE DISPLAY DEVICE IN WHICH ELONGATED ELECTRODES UNDERLIE THE SIGNAL LINES TO FORM CAPACITORS WITH THE PIXEL ELECTRODES AND MANUFACTURING METHOD

BACKGROUND OF THE INVENTION

The present invention relates to an active matrix type display having a pixel electrode array which employs thin film transistors (TFT) as switching elements, and a method of manufacturing same.

The conventional active matrix type liquid crystal displays (AM-LCDs) have a liquid crystal element interposed between an array substrate and a counter substrate.

The array substrate includes a matrix array of pixel electrodes disposed on a transparent substrate such as a glass substrate, scanning lines disposed along the columns of the pixel electrode array, signal lines disposed along the electrode rows of the pixel electrode array, TFTs which control the pixel electrodes in response to the voltage signal applied to the scanning lines and the signal lines, and storage capacitor electrodes electrically connected to the pixel electrodes through an insulating layer.

The counter substrate includes a counter electrode disposed on a transparent substrate such as a glass substrate and confronted with the matrix array of the pixel electrodes, and a black matrix which shields the pixel electrodes. When the AM-LCD is used in a color display system, a color inking layer is disposed on the area surrounded by the black matrix and faces to the pixel electrodes.

The liquid crystal display supplies an "active" voltage to one of the scanning lines from the upper column of the matrix array and a "non-active" voltage to the other scanning lines. When each TFT is turned on through a switching interval, the TFT transmits the voltage applied on the signal line to the pixel electrode. And when each TFT is turned off through a holding interval, the voltage transmitted to the pixel electrode is held by the pixel capacitor composed between the pixel electrode and the counter electrode and the storage capacitor composed between the pixel electrode and the storage electrode.

The holding interval is equal to the interval of application of the active voltage. The transparency of the liquid crystal layer is changed according to the voltage between the pixel electrode and the counter electrode. The LCD displays the image by controlling the distribution of the transparency of the liquid crystal layer and modifying the light from a backlight source.

The aperture ratio of each pixel is indicated as a ratio of the transparent area to the whole pixel area. In the conventional LCDs, the aperture ratio is generally 30% to 40%. Accordingly, it is difficult to gain hopeful brightness. As a countermeasure to this problem, it is considered to increase the light intensity of the light source, but this measure has a shortcoming in that it results in the increase of power consumption.

It is considered to decrease the area of a driving circuit of each pixel as another measure, but it causes difficulty in maintaining production yield.

SUMMARY OF THE INVENTION

It is therefore an object of the present invention to provide an active matrix type display which is suitable for a high display performance and for high productivity.

To achieve the object of the invention, as embodied and broadly described herein, the invention comprises a plurality of scanning lines disposed on a insulating substrate, a plurality of signal lines crossing the scanning line, a gate insulating layer interposed between the scanning line and the signal line, a plurality of thin film transistors having a semiconductor layer disposed on the gate insulating layer and a passivation layer disposed on the semiconductor layer, a plurality of capacity actuation type pixels disposed at the crossing points of the scanning lines and the signal lines, wherein each pixel has a pixel electrode which is electrically coupled with the signal line through the thin film transistor, a plurality of elongated electrodes disposed along the direction of the signal line, wherein each elongated electrode is wider than the signal electrode and has a portion overlapping the signal line through a dielectric layer the same layer as the gate insulating layer and the semiconductor layer, a plurality of storage capacitors electrically coupled with the capacity actuation type pixels, wherein each storage capacitor has a first electrode as a part of the pixel electrode and a second electrode as a part of the elongated electrode.

DESCRIPTION OF THE PREFERRED EMBODIMENTS

Figure 1:
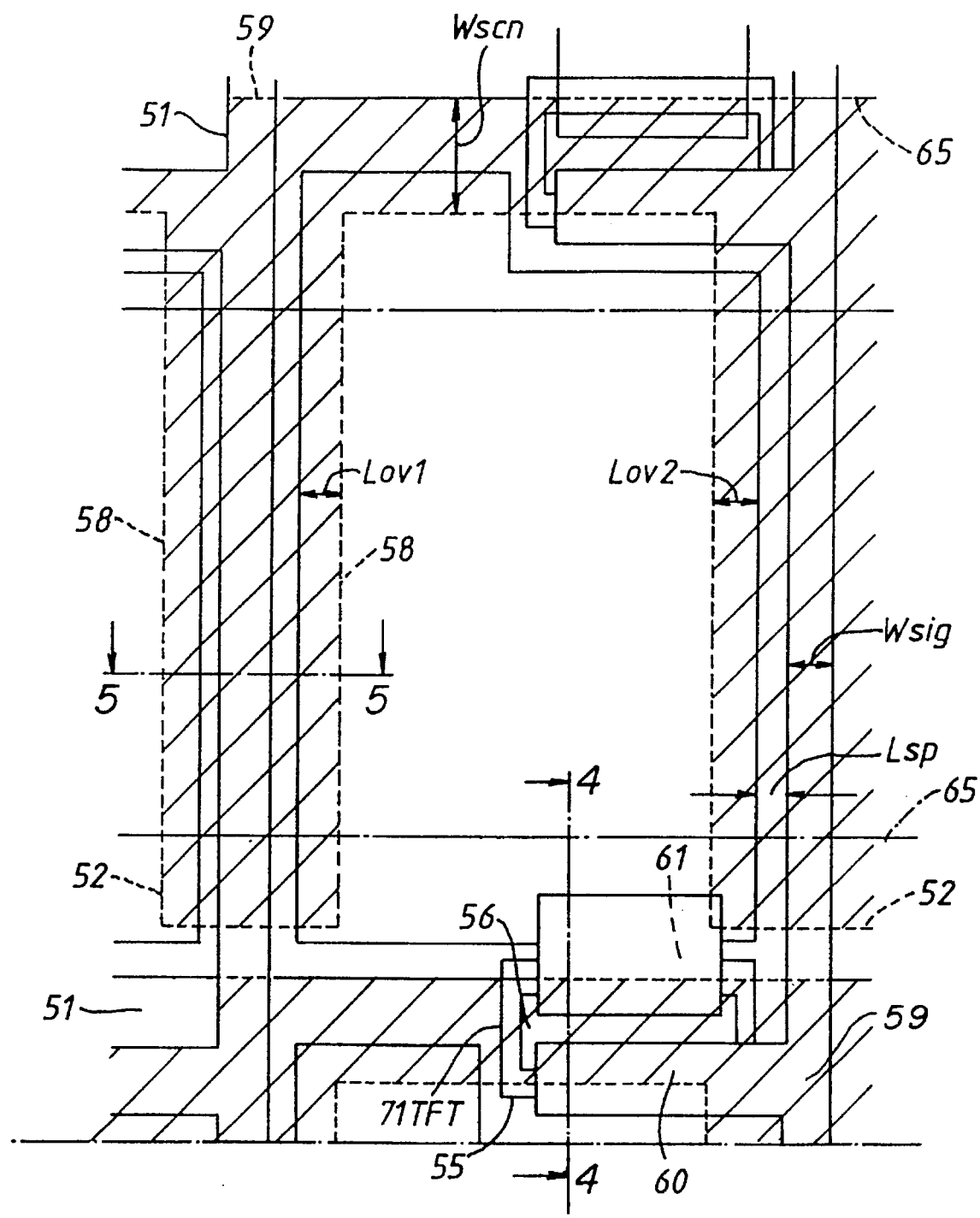
FIG. 1 is a plan view of a pixel area of an active matrix type liquid crystal display of the present invention.
Figure 2:
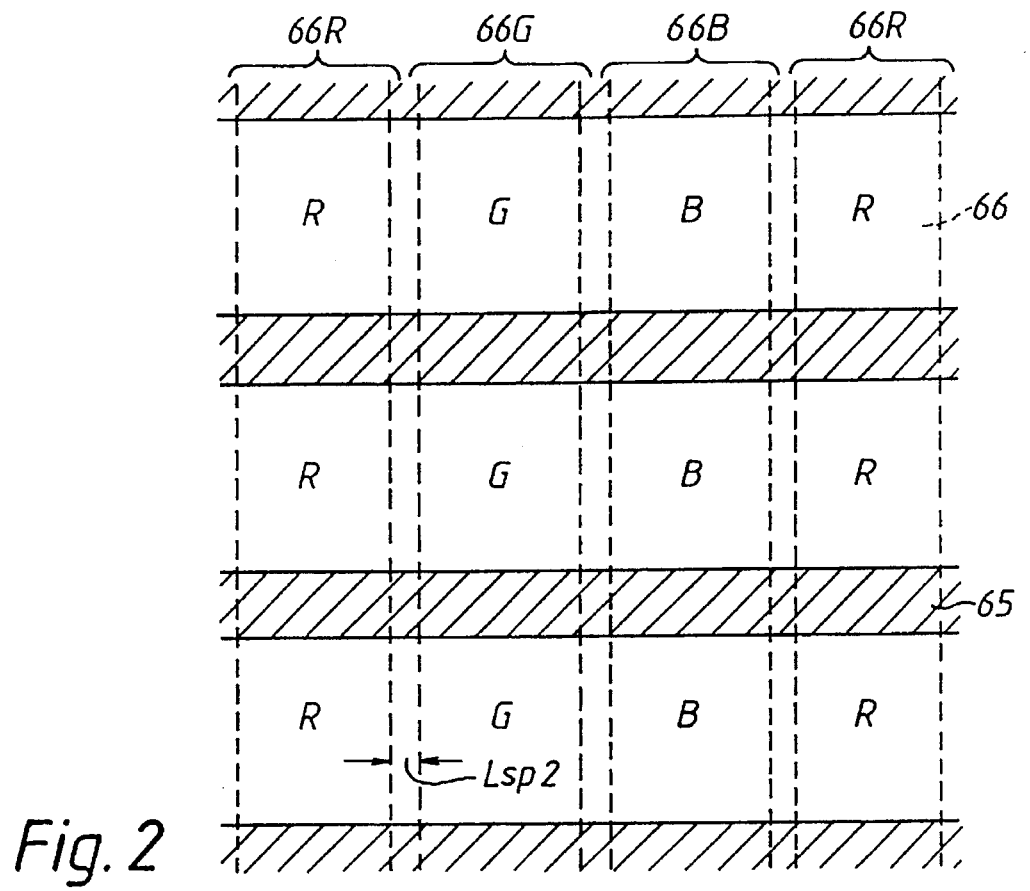
FIG. 2 is a plan view of the counter substrate of the active matrix type liquid crystal display shown in FIG. 1.

Where appropriate, like reference numerals refer to corresponding parts throughout the several figures of the drawings.

Figure 4:
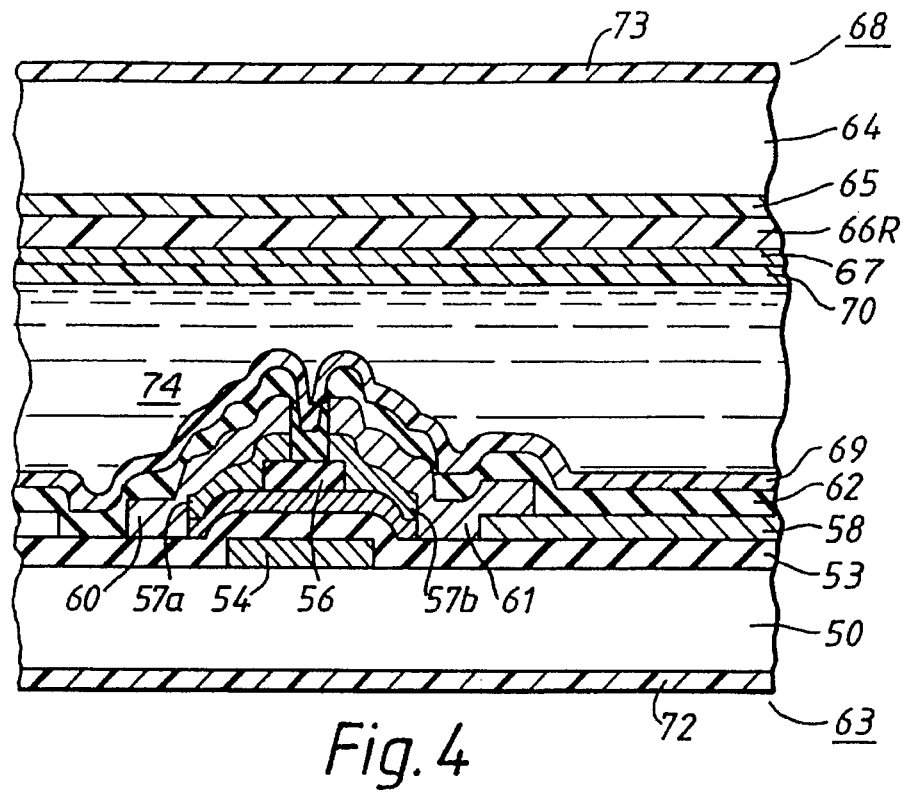
FIG. 4 is a cross-sectional view of the active matrix type liquid crystal display, taken on line 4—4 of FIG. 1.
Figure 5:
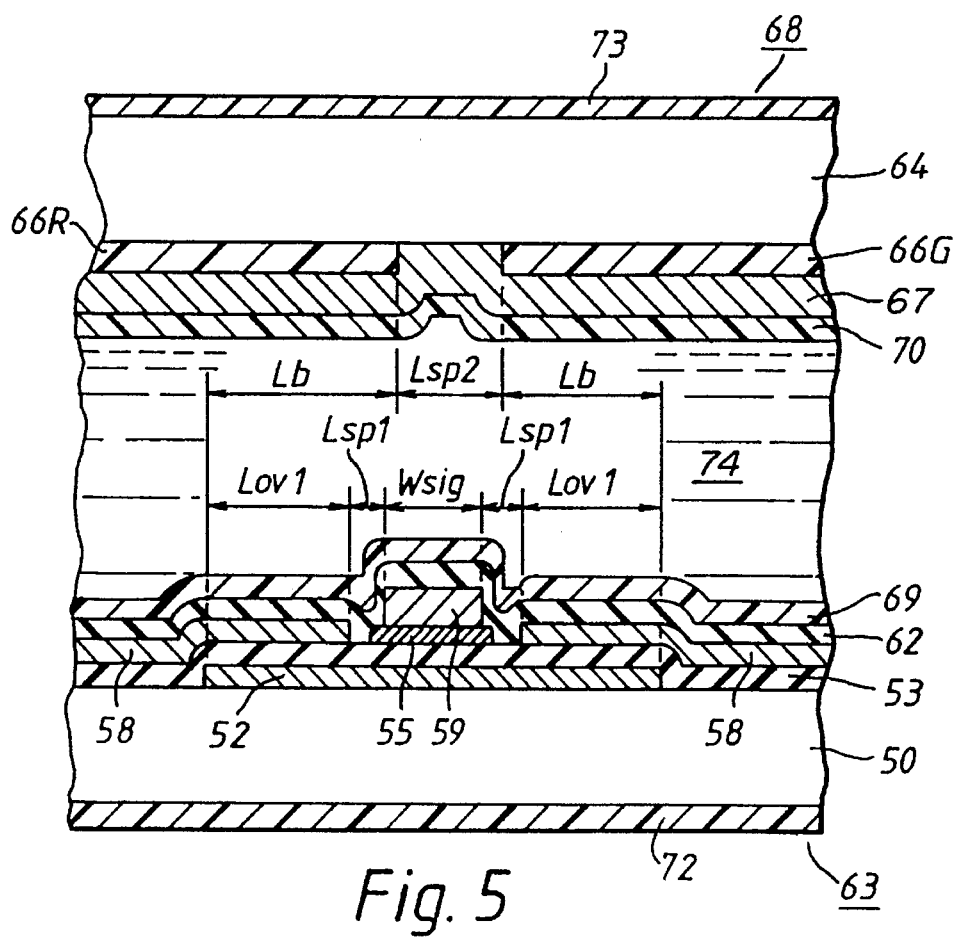
FIG. 5 shows a cross-sectional view of the active matrix type liquid crystal display, taken on line 5—5 of FIG. 1.

In the first embodiment of the invention shown in FIG. 1, FIG. 4 and FIG. 5, an array substrate 63 has scanning lines 51 and signal lines 59 disposed on a transparent substrate 50 and crossing each other with a gate insulator 53 interposed therebetween. The width (shown in FIG. 4) Wscn of the scanning line 51 is 14 μm, and the width Wsig of the signal line 59 is 5 μm, for example.

The pixel electrode 58 is disposed on the area intersected by the scanning line 51 and the signal line 59. The distance Lsp1 between the signal line 59 and the pixel electrode 58 is 3 μm, for example.

The TFT 71 serves as a switching element which drives and controls the pixel electrode 58, and is on the scanning line 51. Namely, a gate electrode 54 of the TFT 71 is composed of a portion of the scanning line 51, a semiconductor layer 55 is disposed on the gate electrode 54 with the gate insulator 53 interposed therebetween, a source electrode 61 and a drain electrode 60 are disposed on the semiconductor layer 55 with passivation insulator 56 therebetween, and the drain electrode 60 is composed of a portion of the signal line 59.

The channel region of the TFT 71 is disposed so as to be contained in the outline of the scanning line 51.

The length L of the channel region is indicated as a minimum distance between the contact region of the source electrode 61 and the semiconductor layer 55 and the contact region of the drain electrode 60 and the semiconductor layer 55, and is 12 μm, in this embodiment. And the width W of the channel region is indicated as the distance between the edge of the source electrode 61 and the drain electrode, and the width W is 30 μm.

The scanning line 51 is elongated under the signal line 59 with the gate insulating layer 53 and the semiconductor layer 55 interposed therebetween, and this elongated portion of the scanning line 51 composes an elongated electrode 52. The elongated electrode 52 is disposed so as to shield the gap between two pixel electrodes 58 neighboring each other, and the width of the electrode 52 is 19 μm.

The elongated electrode 52 and the neighboring pixel electrodes 58 are overlapped together having the width Lovi about 4 μm. And each of the elongated electrodes 52 is overlapped with the side edge of the pixel electrode 58, and each of the electrodes 52 has an overlapped portion equal to the length of the pixel electrode 58.

As shown in FIG. 4 and FIG. 5, a counter substrate 68 has a shading layer 65 disposed on a transparent substrate 50 and extending along the scanning line 51, having the width of 40 μm, and color inking layer 66 of R (red), G (green), B (blue) extending to the cross direction with the shading layer 65, having the width of 97 μm. The distance Lsp2 between the neighboring two color layers 66 is 3 μm. The counter substrate 68 has a counter electrode 67 disposed on the color layer 66 and an orientation layer 70 covering the counter electrode 67.

Figure 3:
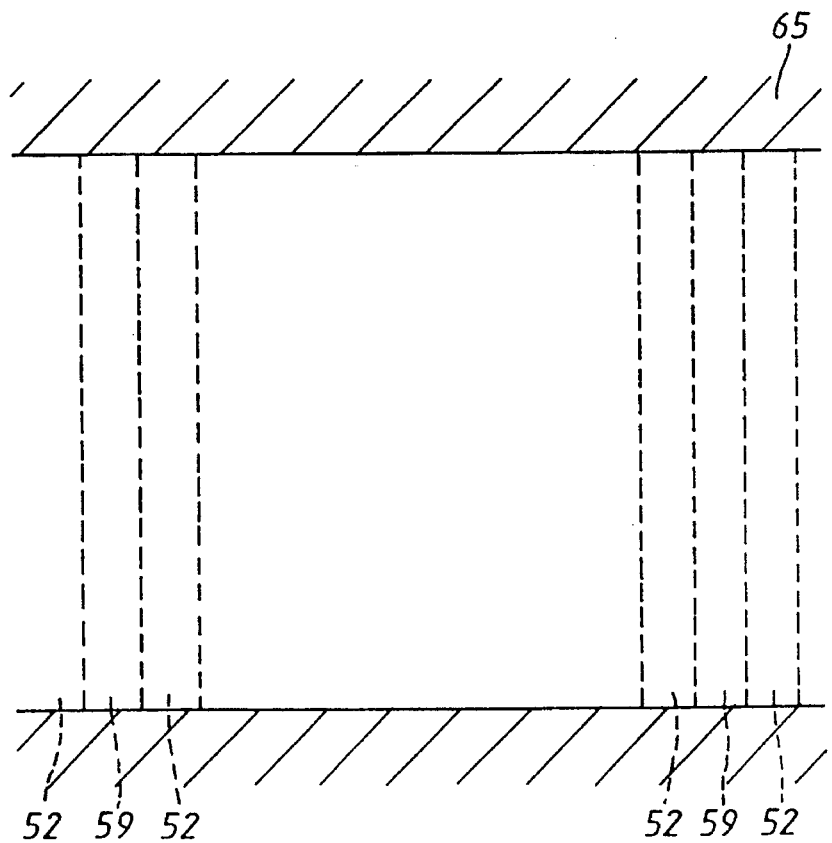
FIG. 3 is a plan view which indicates the effective display area of the active matrix type liquid crystal display shown in FIG. 1.

As shown in FIG. 3, the aperture of one pixel is regulated at the area surrounded by the shading layer 65, the elongated electrode 52 and the signal line 59.

Next, the manufacturing method of the above-mentioned AM-LCD is demonstrated. First, the scanning line 51, the gate electrode which is a part of the scanning line 51 and the elongated electrode 52 are formed by carrying out photo etching process after carrying out the deposition of Ta film on the principal plane of the transparent substrate 50, which consists of glass, by 3000 angstrom thickness using the sputtering method.

The gate insulating layer 53 is formed on the whole surface by carrying out the deposition of SiOx film to 3500 angstrom thickness using the plasma CVD method, so that it covers these electrodes subsequently.

Next, i-type hydrogenated amorphous silicon (a-Si) layer to a 500 angstrom thickness and SiNx layer to a 200 angstrom thickness are formed in successive plasma CVD steps.

Subsequently this SiNx layer is photo-etched to a predetermined configuration, and the passivation insulator 56 is formed. Furthermore, a 500 angstrom thick layer of n-type a-Si is formed using plasma CVD method, and a photo etching process on this n-type a-Si layer and the i-type a-Si layer is carried out at the predetermined configuration, and semiconductor layer 55 and ohmic layers 57a and 57b are formed.

Next a 1000 angstrom deposition, with the sputtering method, and photo etching process of ITO film is carried out at the predetermined configuration, and the pixel electrodes 58 are formed. And subsequently, Mo film of 700 angstrom thickness and Al film of 3500 angstrom thickness are deposited using sputtering method, and photo etching process of these films is carried out at the predetermined configuration, so as to form the signal lines 59, the drain electrodes 60 and the source electrodes 61. And the parts of the n-type a-Si layer between the drain electrodes 60 and the source electrodes 61 are eliminated, using a photo-resist. And the array substrate 63 is obtained by forming on the whole surface a passivation layer of SiNx film, using plasma CVD method.

On the other hand, Cr film is deposited to a 1000 angstrom thickness on the principal plane of the transparent substrate 64, which consists of glass, using sputtering method and this film is photo etched to the predetermined configuration to form the shading layer 65. And the color inking layer 66 of R, G, B is formed at the region which is surrounded by the shading layer 65.

This color inking layer 66 may be obtained by photo-etching a layer of photo-resist with pigment dispersed therein at the predetermined region. Also it may be obtained by a layer of binder resin with the pigment dispersed therein. In this embodiment, each color inking layer 66 is obtained by attaching a layer of 1.2 μm with pigment dispersed therein and photo etching this layer. Subsequently, the counter electrode 65 of ITO film is formed to a 1500 angstrom thickness using sputtering method, and the counter substrate 68 is obtained.

Then, the orientation layers 69 and 70 are disposed on the electrode formation side of the array substrate 63 and the counter substrate 68, by printing the low-temperature cure type polyimid film and rubbing these layers to give the orientation of a predetermined direction. And the liquid crystal cell is obtained by combining the array substrate 63 and the counter substrate 68 so that the orientation axis of these substrates are crossed at the angle of 90 degree.

At this time, positioning of the array substrate 63 with the counter substrate 68 is carried out using the alignment mark prepared in the predetermined location of the transparent substrates 50 and 64. Subsequently, liquid crystal material 74 is impregnated into the above-mentioned liquid crystal cell, and polarization films 72 and 73 are stuck on the outer plane of the array substrate 63 and the counter substrate 68, and the AM-LCD of this embodiment is obtained.

Next, the example of an operation of the above-mentioned AM-LCD is demonstrated.

Figure 6:
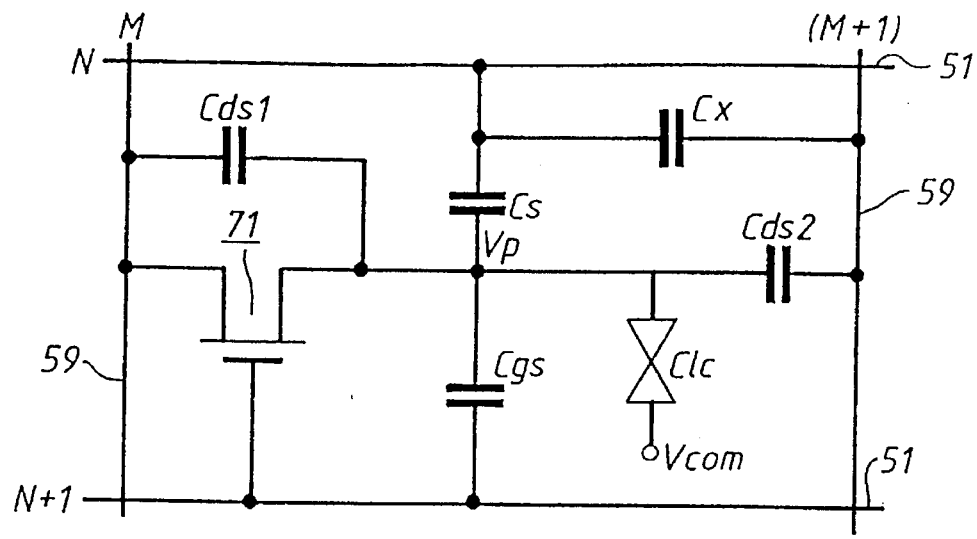
FIG. 6 indicates the equivalent circuit of each pixel of the active matrix type liquid crystal display shown in FIG. 1.

FIG. 6 shows the equivalent circuit of each pixel of the AM-LCD. This equivalent circuit includes a storage capacitor Cs composed of the capacity coupling of the pixel electrode 58 and the elongated electrode 52, the capacitors Cds1 and Cds2 composed of the capacity coupling of the pixel electrode 58 and two signal lines 59 flanking the pixel electrode 58, the capacitor Cgs composed of the capacity coupling of the gate electrode 54 and the source electrode 61, a liquid crystal capacitor Clc composed of the capacity coupling of the pixel electrode 58 and the counter electrode 67 through the liquid crystal layer 74, and a capacitor Cx composed of the capacity coupling which is mainly yielded at the overlapping portion of the elongated electrode 52 and the signal line 59.

Figure 7:
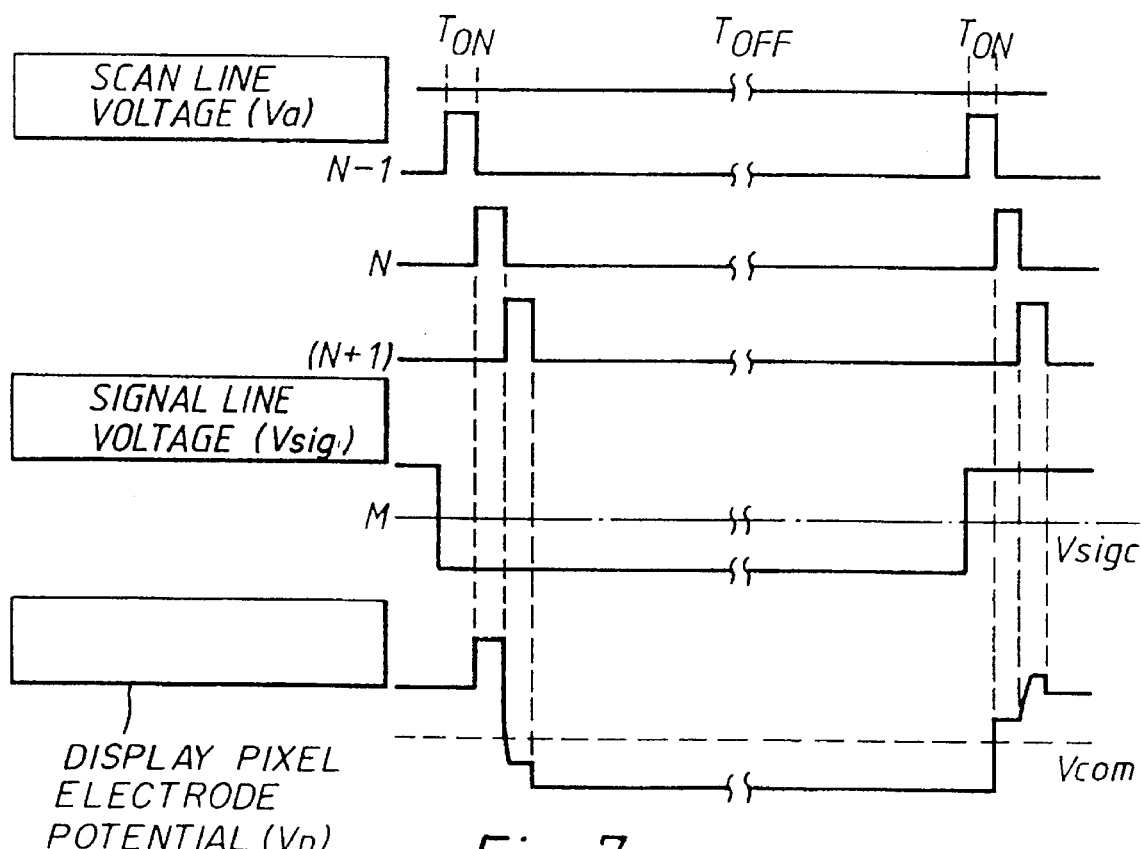
FIG. 7 is a timing chart of one example of the voltage driving wave form of the active matrix type liquid crystal display of this invention.

FIG. 7 indicates a example of timing chart of the driving voltage during operation. The liquid crystal display receives an "active" voltage on one of the scanning lines from the upper column of the matrix array and nonactive-voltages to the other scanning lines. At each scanning line 51, the active voltage is maintained at the switching interval Ton which is equal to a horizontal scanning interval of images which changes each frame interval, and the non-active voltage is maintained at the holding interval Toff which is equal to an interval between active voltage pulses.

On the other hand, a liquid crystal display image signal, according to one column line in a horizontal scanning cycle, is applied to the signal line 59. The polarity of the image signal is inverted from the reference voltage Vsigc every predetermined cycle, for example every frame cycle. In this embodiment, regarding the active voltage Vg, on is considered as 25 V and regarding, the non-active voltage Vg, off is 2 V. And the reference voltage Vsigc is established as 7 V, and the signal voltage Vsig is inverted by the amplitude of 5 V from the voltage Vsigc, actually Vsig is established from the maximum amplitude 1 V of the negative side to the maximum amplitude 12 V of the positive side.

The voltage Vp of the pixel electrode 58 is changed to the signal line voltage at the interval Ton, and is held there for the interval Toff. The pixel electrode 58 is capacity coupled with the elongated electrode 52 to make the storage capacitor Cs, so it is able to prevent the significant change of the voltage Vp in the interval Toff. And display is performed by optical transmission of liquid crystal layer 74 varying according to electric potential difference of the voltage Vcom of the counter electrode 67 and the voltage Vp of the pixel electrode 58. The voltage Vcom is established as 6 V in this case of the operation.

In this embodiment, the aperture ratio of the AM-LCD is 70% and therefore the utilization effectiveness of transmitted light from the light source rises, and electric power consumption can be reduced significantly. And a high grade display image is obtained owing to shading of the regions between pixel electrodes 58.

Namely, the voltage of the pixel electrode 58 changes according to the change of the voltage of the signal line 59 at a horizontal scanning interval. Because of the dependency of the change of signal line 59 voltage on the image information, it is difficult to compensate the change of the voltage of the pixel electrode 58 uniformly.

Contrary to this, the voltage of the scanning line 51 is fixed to the non-active voltage at the holding interval, and the change of the voltage of the pixel electrode 58 according to the scanning line 51 is substantially definite, so one can compensate the change of the voltage of the pixel electrode 58 using appropriate counter electrode voltages, for example.

In this point of view, the elongated electrode 52 is disposed along the parallel portion between the signal line 59 and the pixel electrode 58, and the overlapped potion is disposed, by the predetermined length, between the elongated electrode 52 and the signal line 59 and between the elongated electrode 52 and the pixel electrode 58. Employing this structure, the electric shield effect of the elongated electrode 52 on the pixel electrode 58 from signal line 59 is increased. Accordingly, it is possible to reduce changes in the pixel electrode voltage, such that the pixel electrode voltages approach the signal line voltage.

Apart from that, the coupling capacitance between the scanning line 51 and the counter electrode 67 might be increased owing to the position of the elongated electrode 52. If the capacitance is increased too much, the CR product of the scanning line 51 is increased, and accordingly distortion of the active pulse occurs.

This distortion is increased according to the distance from the supplying point of the active pulse. On account of this, irregular voltages might be impressed on the pixel electrode 58 because the turned on interval of the TFT is shortened or other irregular action of the TFT.

On the contrary, the elongated electrode 52 of this embodiment is interposed between the substrate 50 and gate insulating layer 53 and disposed on the predetermined region corresponding to the pixel electrode 58 and the signal electrode 59. That is, the elongated electrode 52 is disposed so as to be apart from the counter electrode 67.

In this case, the capacitance between the elongated 52 and the counter electrode 67 is established as a serial capacitance of the liquid crystal capacitance and the capacitance of the gate insulating layer, and it is able to reduce the coupling capacitance between the counter electrode 67 and the scanning line 51 and between the counter electrode 67 and the elongated electrode 52.

The relative dielectric constant of the gate insulating layer 53 is about 4 and the constant of the liquid crystal layer is about 3.5 to 8 in this embodiment. In this case, the capacitance between the scanning line 51 or elongated electrode 52 and the counter electrode 67 is decreased by 10% in comparison to the LCD which has no effective insulator, such as gate insulating layer between its liquid crystal layer and its elongated electrode or its scanning line. This effect is extremely significant.

According to use of the structure of this embodiment, one may drive a large scale AM-LCD, which has more than 1920 signal lines and the capacitance belonging to the scanning electrode increases accordingly.

Further, another driving method which employs the alternating wave form of the counter electrode voltage within the same cycle as the alternation of the signal electrode voltage is known. By using this method, the voltage of the signal line driver can be reduced and it is useful to reduce the manufacturing cost of the display device.

In this case, however, the voltage applied on the counter electrode 67 is distortioned when the capacitance and the CR product belonging to the counter electrode increases too much. Accordingly, the liquid crystal capacitor is not charged up to the predetermined level and the uniformity of the image might be degraded.

On the other hand, since the capacitance between the scanning line or the elongated electrode and the counter electrode can be reduced in the embodiment of this invention, the above-mentioned uniformity is improved. It is especially effective when the interval of the driving signals is established to coincide with the horizontal scanning interval.

Furthermore, the elongated electrode 52 and the scanning line 51 are in one piece, to conserve space, which is necessary when an independent main electrode is employed to supply voltage to the elongated electrode 52 and is disposed separately from the scanning line. And the elongated electrode 52 is disposed so that it shades the region between the signal line 59 and the pixel electrode, so the area of the shading means is reduced, and the aperture ratio of each pixel is increased sharply.

This effect of increased aperture ratio is explained in more detail. In the field of AM-LCD, it is known that the liquid crystal material shows irregular alignment at the edge portions of the pixel regions as a "tilt-reverse" phenomenon. The AM-LCD according to this embodiment can shade the tilt-reverse portion along the signal line completely and realize high performance.

Tilt-reverse phenomenon, due to the irregular alignment of the liquid crystal material along the electric field between the pixel electrode and the signal line at the peripheral portion of the pixel area, causes undesirable light passage through the boundary between this irregular alignment region and the regular alignment region.

In this embodiment, this tilt-reverse domain can be shaded completely by adjustment of the width of the overlapping portion between the pixel electrode and the elongated electrode 52.

The elongated electrode 52 is established substantially at the non-active voltage, that is, 0 V, and the pixel electrode 58 is established at the signal voltage having an amplitude of 3 V to 5 V from the center voltage 6 V. In this operation, an electric field between the elongated electrode 52 and the pixel electrode 58 is generated, and it is considered that another tilt-reverse domain might occur along the electric field from the elongated electrode 52 through the region between the pixel electrode 58 and the signal line 59.

However, as long as the tilt-reverse domain near the signal line 59 is shaded, the liquid crystal layer 74 disposed on the inner pixel area (effective display area) surrounded by the elongated electrode 52 is controlled directly by the electric field between the pixel electrode 58 and the counter electrode 67, and is aligned toward the original direction.

Namely, the liquid crystal layer 74 at the effective display area is not effected directly by the electric field from the elongated electrode 52, so region within the effective display area is not generated.

Accordingly the tilt-reverse domain generated between the signal line 59 and the pixel electrode 58 can be shaded without another independent shading means, and thus the elongated electrode 52 contributes to a larger aperture ratio. In this embodiment, tilt-reverse domain along the signal line is not observed.

According to the structure of this embodiment, the width of the elongated electrode 52 is established so as to be capable of shading the tilt-reverse domain. The width of the scanning line 51 may be established as the same width as the elongated electrode 52, but it is suitable to set the width of the elongated electrode 52 narrower than the scanning line 51.

The operation speed of the TFT 71 increases in proportion with the shortening the length of the channel region of the TFT 71, which is disposed along the scanning line 51. However, as long as the length of the channel region is reduced without changing the width of the scanning line 51, the overlapping area between the source electrode 61 and the scanning line 51, and the capacitance between these electrode is also increased. The level shift voltage $\Delta Vp$ is indicated as follows.

$$\Delta Vp = (Cgs/C1,) \Delta Vg$$

(In above expression, C1 indicates the sum of the capacitance Cgs, Clc, Cs, Cds1, Cds2 and Cx, and $\Delta Vg$ indicates the difference between the active voltage and the non-active voltage applied to the scanning line)

In this embodiment, the capacitor Cx acts as a MOS capacitor. In order to observe the effect of this capacitor, TEG (Test Elementary Group) 1, which includes a capacitor having the same structure as above-mentioned capacitor and made through the same producing process as the element in the display area of the AM-LCD, the capacitance was investigated by applying predetermined voltage.

Figure 8:
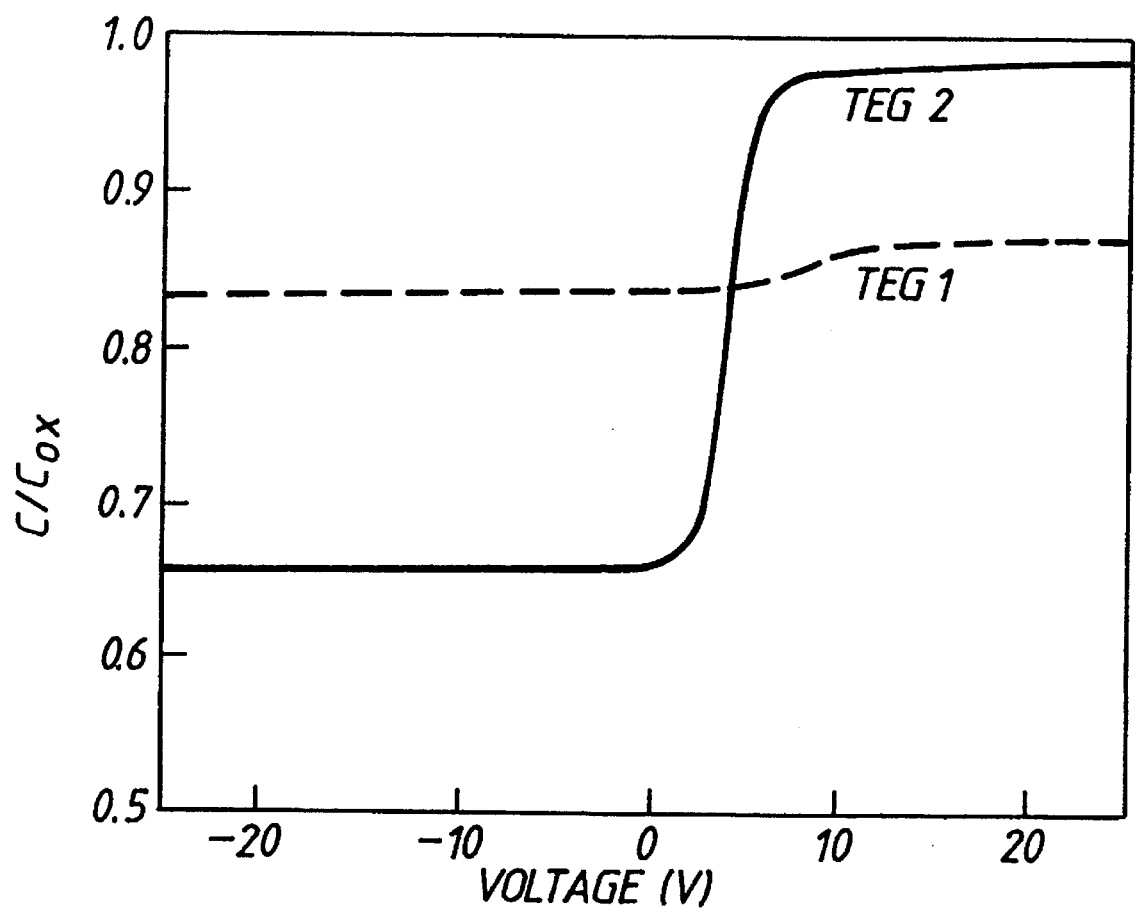
FIG. 8 shows electrical characteristic curves of the active matrix tyke liquid crystal display of this invention.

FIG. 8 shows the results of the above investigation. The vertical axis indicates the value the investigated capacitance value C normalized by the value Cox, which indicates the capacitance of the capacitor having only a gate insulating layer as its dielectric layer, and the horizontal axis indicates the applied voltage. And the broken line shows the result of the investigation of TEG 1.

As shown in FIG. 8, the amplitude of the capacitance change of TEG 1 is 0.04 as long as the applied voltage is established between the range of 15 V and −15 V. This range is considered as actual range applied to the capacitor disposed on the peripheral portion of each pixel area under general operation.

As shown above, the amplitude of the capacitance change of the parasitic capacitor Cx is minimized. So the level shift voltage $\Delta Vp$ can be compensated by adjusting the capacitance of Cs between the elongated electrode 52 and the pixel electrode 58. Accordingly, unevenness of the image is eliminated in this embodiment.

In comparison to this, another AM-LCD was obtained without any passivation insulating layer on the channel region of its TFT, and TEG 2, which includes a capacitor having the same structure of its pixel area and the specifics of the capacitor was investigated. The curve TEG 2 in FIG. 8 indicates the result of this investigation. The difference in the manufacturing method of AM-LCD and the method of investigating the capacitor specifics in comparison to the above method is that the passivation layer is not formed on the channel region, and, consequently, the thickness of its semiconductor layer is established as 3300 angstroms.

As shown in FIG. 8, the amplitude of the capacitance change of TEG 2 reaches about 0.33. Further the observation was carried out by operating this AM-LCD using the same driving method as above. As a result, unevenness of the images is occurred.

Furthermore, the AM-LCD which employs the structure of this embodiment has no short-circuit defect between the signal line 59 and the elongated electrode 52.

In addition to this, the Nth column scanning line 51 and the elongated electrode 52 are formed in one piece. This elongated electrode 52 is electrically coupled with the (N+1)th column pixel electrode 58 to make a capacitor Cs. The voltage of pixel electrode 58 is changed at the timing the active voltage is applied on the Nth column scanning line.

After that, the active voltage is applied on the (N+1)th column pixel electrode 58 and the signal voltage of the signal line 59 is transmitted to the (N+1)th column pixel electrode 58. The voltage of the Nth elongated electrode 52 is held during the holding interval. So the interval of holding the original voltage of the pixel electrode 58 is substantially equal to the holding interval.

As the transparency of the liquid crystal layer 74 is changed in response with the effective value of the applied voltage, display images are scarcely effected by the change of the pixel electrode voltage according to the change of the elongated electrode voltage.

And the channel region of the TFT 71 is formed within the outline of the scanning line. This formation of the channel region does not limit the formation of the elongated electrode 52, and contributes to increased aperture ratio of the AM-LCD.

Furthermore, two elongated electrodes 52 may be formed at each side of the pixel electrode 58, and these electrodes have the overlapping portions with the signal line 59 and the pixel electrode 58 of substantially equal length to each other. Accordingly, although the positioning of the elongated electrode 52 relative to the pixel electrode may be shifted along its length direction, the capacitance of the pixel electrode 58 coupled with the both sides of the signal line 59 is a substantially constant value. This structure is suitable while the so-called "V-line inversion" driving method is carried out.

According to this V-line inversion driving method, the applied voltages on the neighboring signal lines are inverted relative to each other with respect to the center voltage of the signal line, and a following effect is obtained by carrying out this method. Namely, the pixel electrode voltage is changed in accordance with the change of the signal voltage because of the electrically coupling between these electrodes. However, if the pixel electrode voltage is changed toward the positive side in accordance with the signal line disposed in one side of the pixel electrode, the other signal line disposed in the other side of the pixel electrode pulls down the pixel electrode voltage to the negative side. As a result, the change of the pixel electrode voltage is substantially canceled.

However, if the capacitors formed at both sides of the pixel electrode are not balanced, this cancellation effect is degraded. Then, in the case of this embodiment, the length of the overlapping portions between the elongated electrode and the signal line or the pixel electrode formed at both sides of the pixel electrode are established as substantially equal, the capacitances formed surrounding the pixel electrode are balanced, and the cancellation effect is not graded. Accordingly, a high performance display is obtained by the fundamental structure of this embodiment, which can reduce the capacitance between the signal line 59 and the pixel electrode 58.

In this embodiment, a LCD of high aperture ratio and high performance is obtained.

One may modify the above invention embodiment variously. For instance, the storage capacitor Cs may be formed by overlapping the pixel electrode 58 and the elongated electrode 52 with the gate insulating layer interposed therebetween. On the other hand the interlayer composed of the gate insulating layer 53 and the semiconductor layer 55 may be interposed between the elongated electrode 52 and the signal line 59. Accordingly, the capacitance Cs can be established as the required value, and the capacitance of Cx can be reduced.

Figure 9:
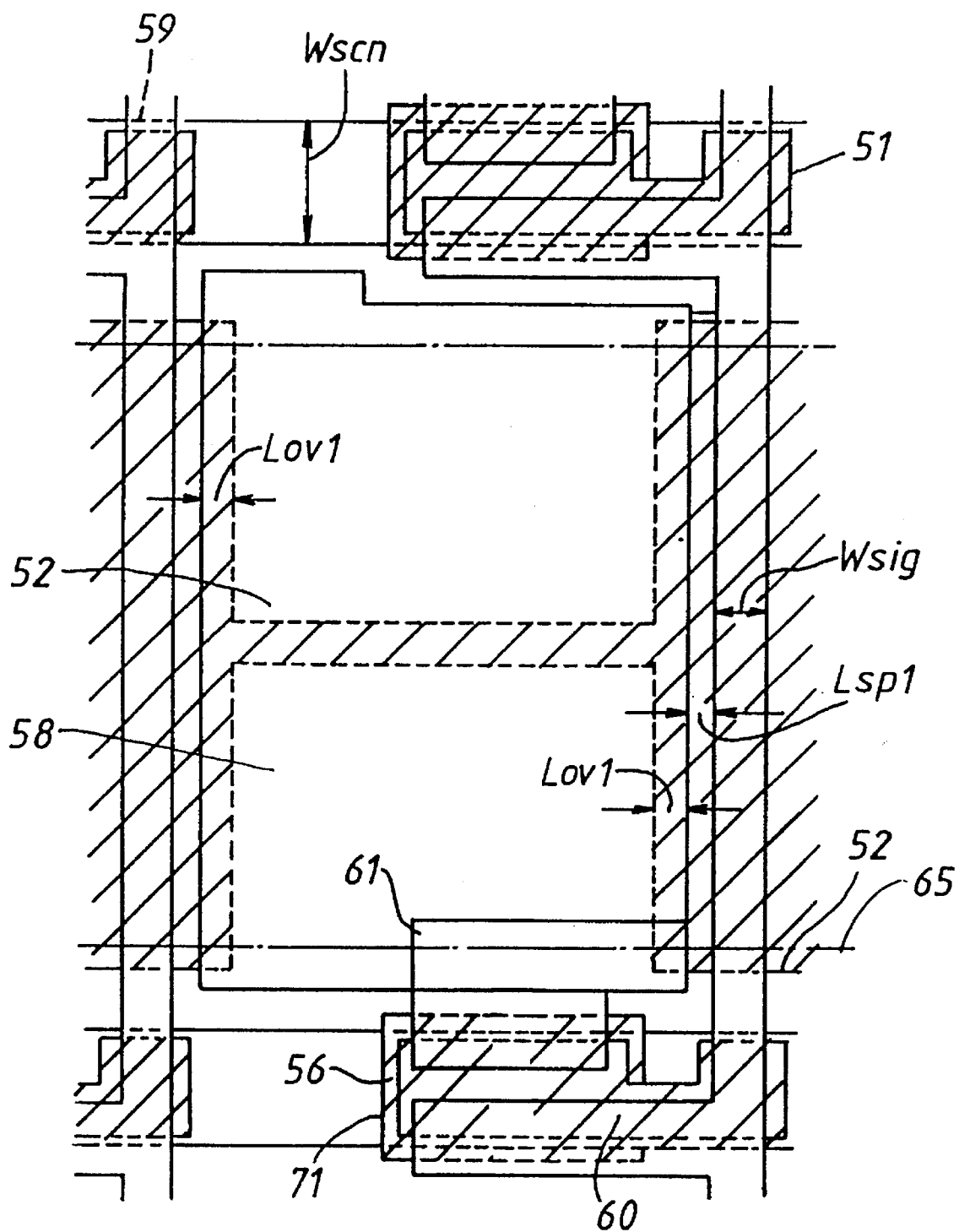
FIG. 9 is a plan view of a pixel area of an active matrix type liquid crystal display according to a second embodiment of this invention.

FIG. 9 shows the second embodiment of this invention. As shown in FIG. 9, the elongated electrode 52 may be branched from the independent supply line. In this case, the aperture ratio is decreased a bit, however the applied voltage on the capacitor Cs can be established at any value so that the freedom of establishing the operating condition is obtained. In this operation, the voltage of the elongated electrode 52 is established as the same voltage as the counter electrode 68. The aperture ratio is at 60% and unevenness of the display is reduced in this embodiment.

Figure 10:
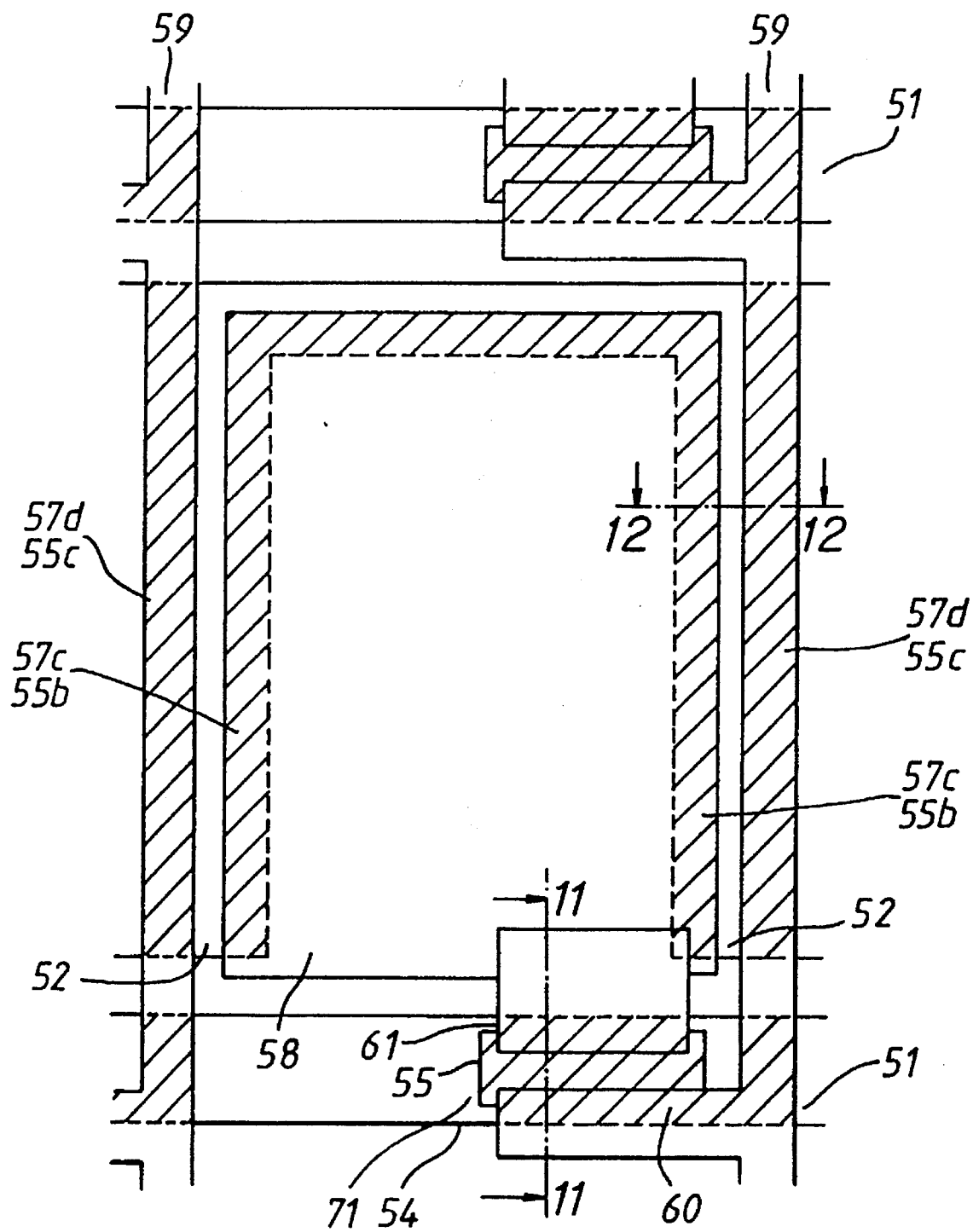
FIG. 10 shows a plan view of a pixel area of an active matrix type liquid crystal display of the third embodiment of this invention.

As shown in FIG. 10, the semiconductor layer 55, formed on the elongated electrode 52, may be substantially aligned with the elongated electrode 52.

Figure 11:
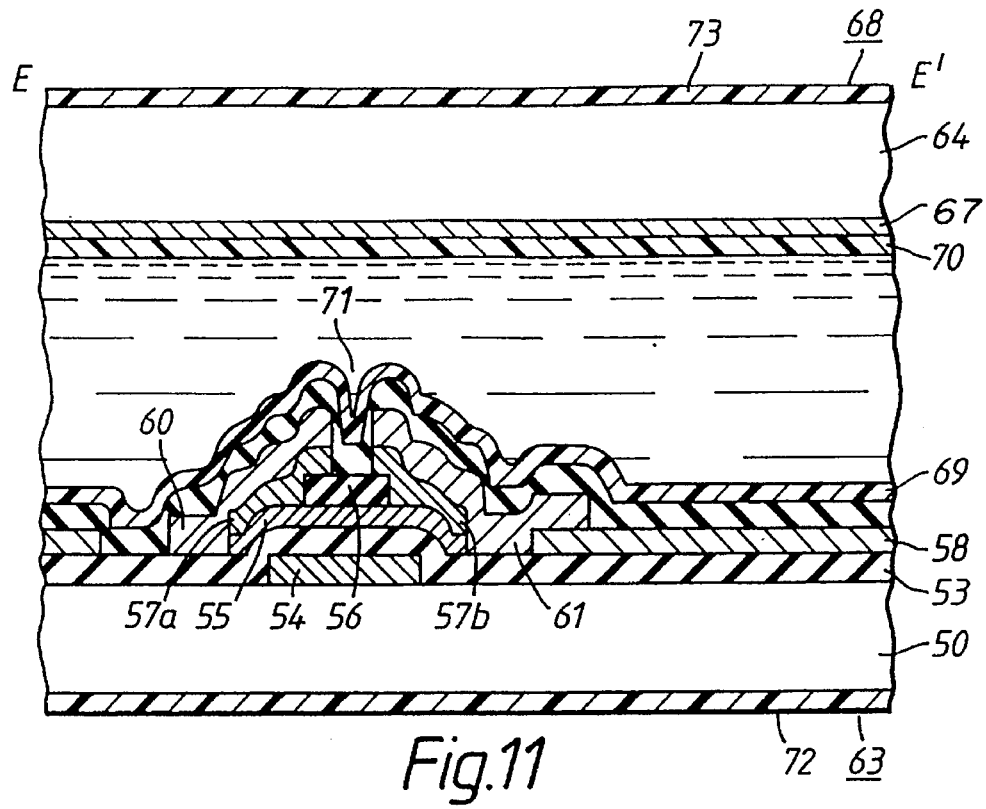
FIG. 11 is a cross-sectional view of the active matrix type liquid crystal display, taken on line 11—11 of FIG. 10.
Figure 12:
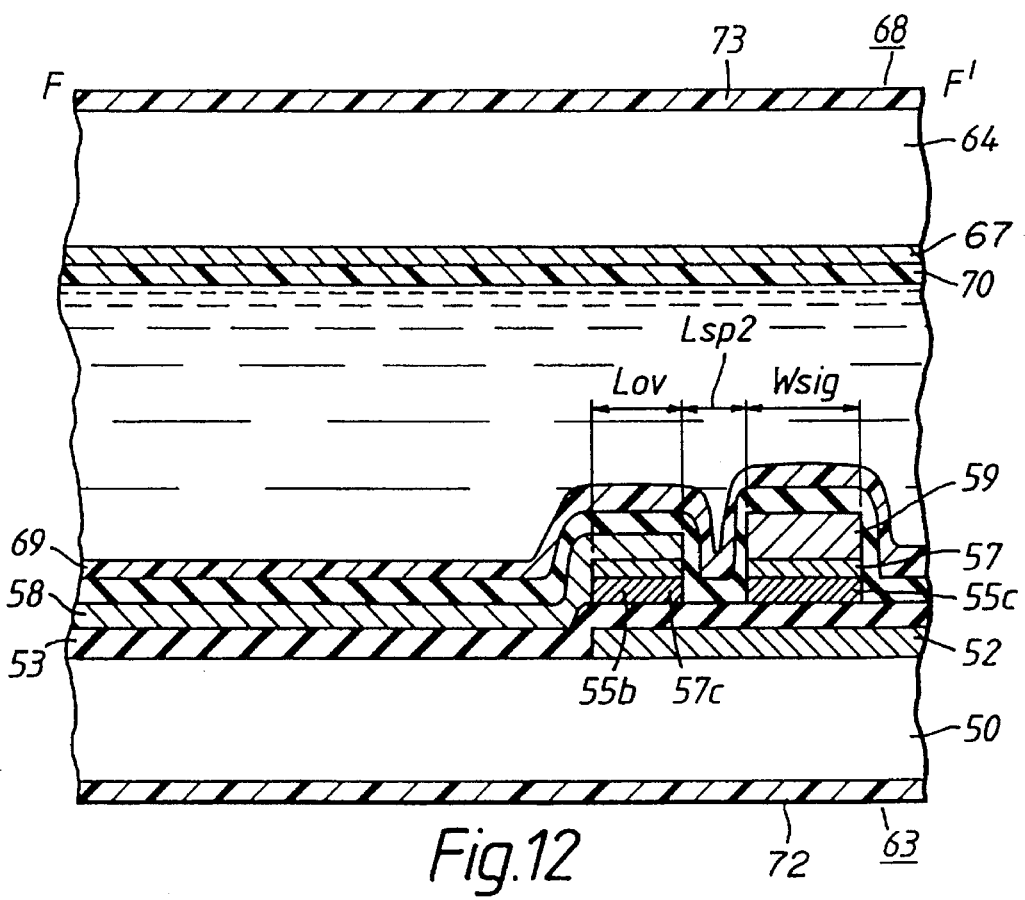
FIG. 12 shows a cross-sectional view of the active matrix type liquid crystal display, taken on line 12—12 of FIG. 10.
Figure 13A:
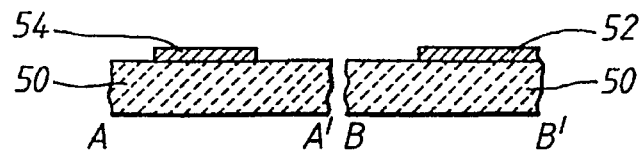
FIGS. 13(a)–13(h) are sectional views illustrating the steps in the exemplary manufacturing process for the active matrix type liquid crystal display of this invention.
Figure 13B:
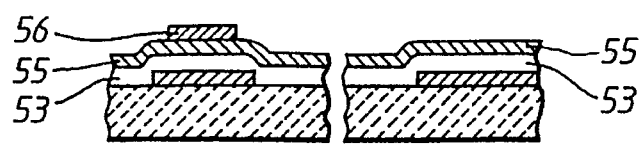
Figure 13C:
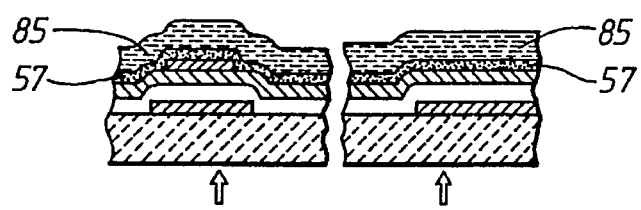
Figure 13D:
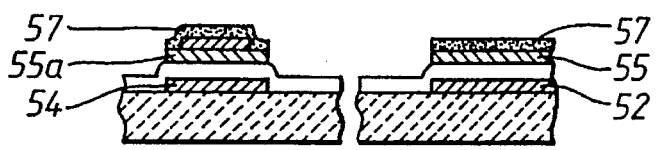
Figure 13E:
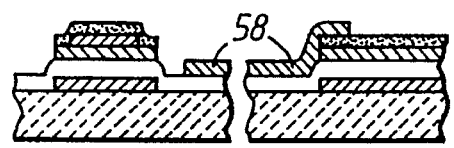
Figure 13F:
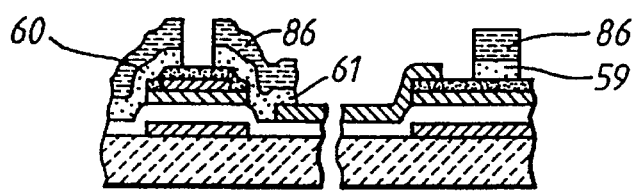
Figure 13G:
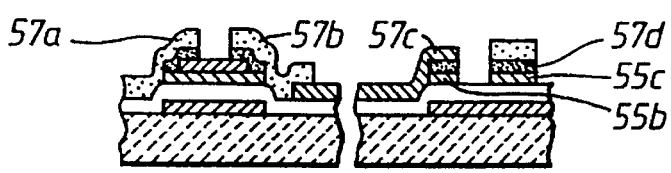
Figure 13H:
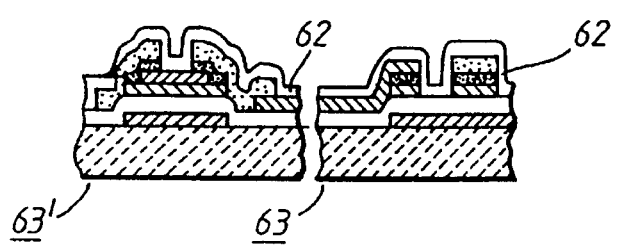

FIG. 10 indicates the plan view of a pixel region of the AM-LCD of the third embodiment. FIG. 11 shows a cross-sectional view, taken on line 11—11 shown in FIG. 10, and FIG. 12 shows a cross-sectional view, taken on line 12—12 indicated in FIG. 10. The fundamental structure of the AM-LCD in this embodiment is substantially the same as the LCD shown in FIG. 1

Next, the manufacturing method of the AM-LCD in this embodiment is demonstrated.

As shown in FIG. 13 (*a*), the scanning line 51, the gate electrode, which is a part of the scanning line 51, and the elongated electrode 52 are formed by photo-etching process after deposition of a Ta film on the principal surface of the transparent substrate 50 consisting of glass of 3000 angstrom thickness, using the sputtering method.

The gate insulating layer 53 is formed on the whole surface by deposition of SiOx film to a 3500 angstrom thickness using the plasma CVD method, so that it covers these electrodes.

Next, an i-type a-Si layer of 500 angstrom thickness and a SiNx layer of 2000 angstrom thickness are successively formed by plasma CVD method.

Subsequently, this SiNx layer is photo-etched to a predetermined configuration, and the passivation insulator 56 is formed, as shown in FIG. 13(*b*). Furthermore, on this insulator, a 700 angstrom thick n-type a-Si layer is formed using plasma CVD method, and subsequently a positive type photo-resist 85 is formed over the whole surface, then the surface including the photo-resist 85 is exposed from the opposite side of the substrate, as shown in FIG. 13(*c*).

And after the development of the resist 85, n-type aSi 57 layer and i-type a-Si layer 55 extending from the portion covered by the photo-resist 85 are eliminated using photo-etching process, leaving portions of layer 55 and layer 57 that are self-aligned with the gate electrode 54 and the elongated electrode 52, as shown in FIG. 13(*d*).

Next a 1000 angstrom thick deposition, by a sputtering method, and a photo-etching process of ITO film are carried out at a predetermined configuration, so that the pixel electrode 58 is formed, as shown in FIG. 13(*e*). And subsequently, a Mo film, of 700 angstrom thickness, and Al film of 3500 angstrom thickness are deposited using a sputtering method, and a photo-etching process on these films is carried out in a predetermined configuration, so as to form the signal lines 59, the drain electrodes 60 and the source electrodes 61, and the part of the n-type a-Si layer and the i-type a-Si layer extending from the portion covered by these electrodes and photo-resist left on these electrodes to form the semiconductor layers 55b and 55c and the ohmic layers 57a, 57b and 57c, as shown in FIG. 13(g).

And the array substrate 63 is obtained by forming a surface passivation layer of SiNx film on the entire surface, using a plasma CVD method.

Then the AM-LCD is obtained by the same manufacturing method as the first embodiment.

In this embodiment, the width Wscn of the scanning line 51 is 14 µm, the width of the signal line 59 is 5 µm, and the distance Lsp2 between the signal line 59 and the pixel electrode 58 is as 4 µm. And the overlapping length Lov of the pixel electrode 58 and the elongated electrode 52 is 4 µm. In this case, the width Ls2 of the elongated electrode 52 is indicated as follows.

$$Ls2=2(Lov+Lsp2)+Wsig$$

Accordingly, the width Ls2 of the elongated electrode 52 is established as 21 µm.

Figure 14:
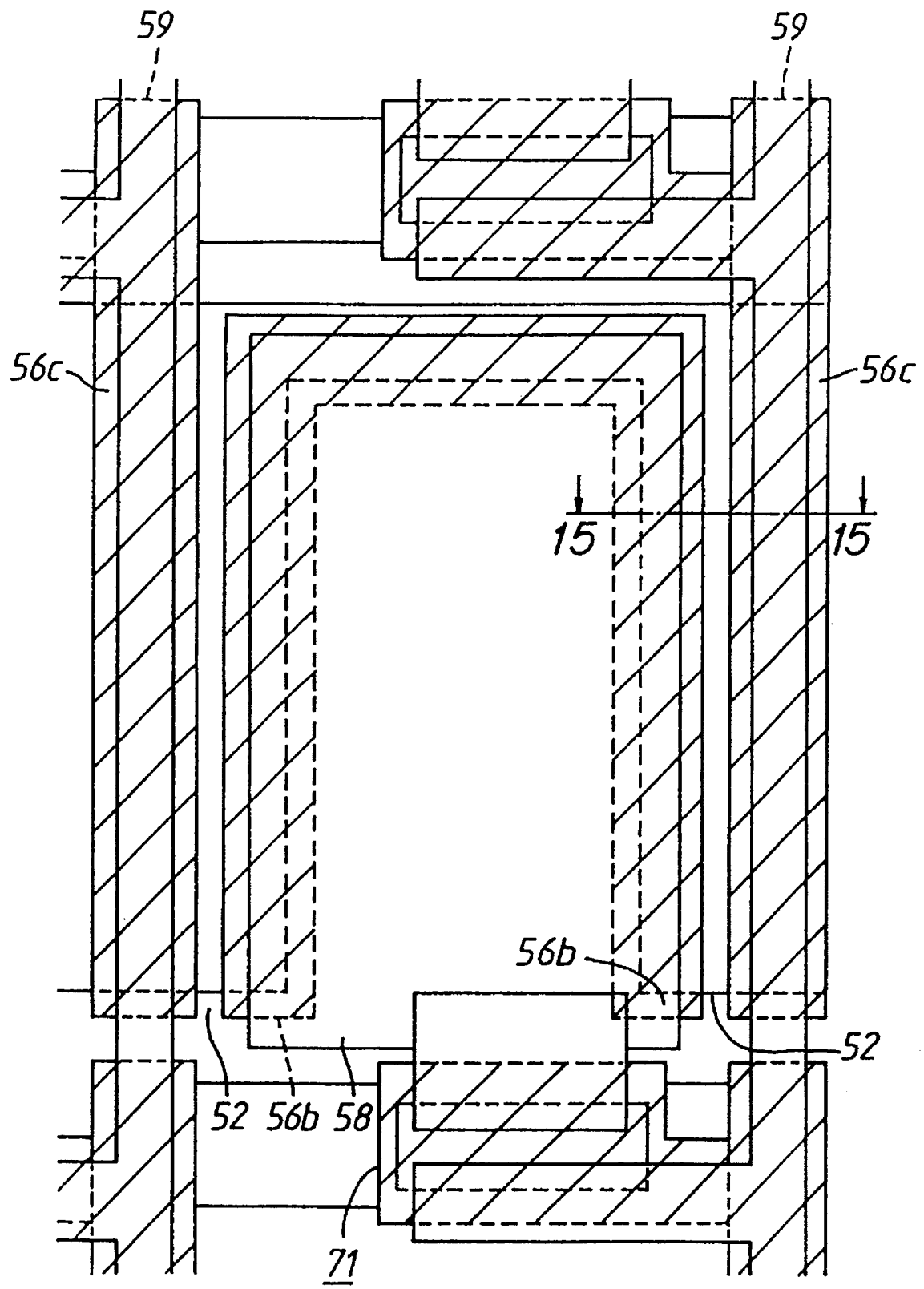
FIG. 14 is a plan view of a pixel area of an active matrix type liquid crystal display of an example compared with this invention.

Another LCD was manufactured as shown in FIG. 14 to compare the LCD aperture ratio with above embodiment.

Figure 15:
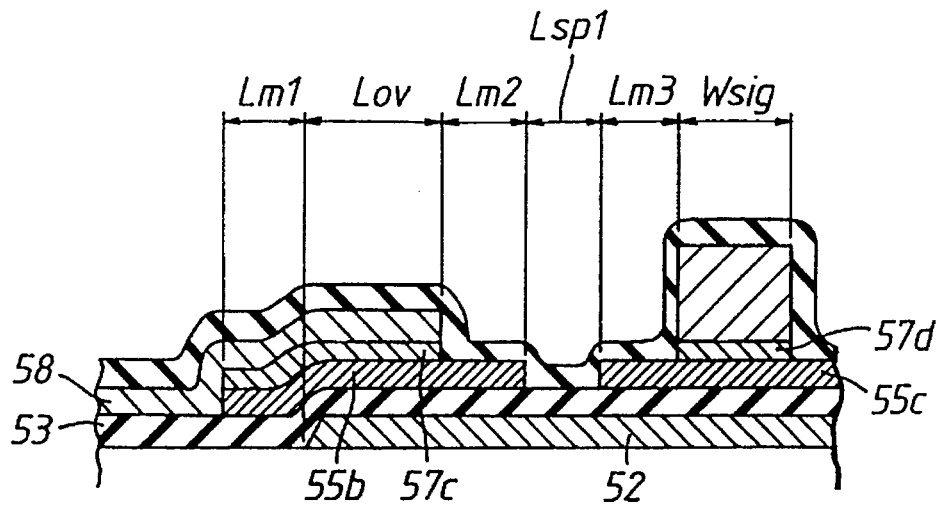
FIG. 15 is a cross-sectional view of the active matrix type liquid crystal display, taken on line 15—15 of FIG. 14.

FIG. 15 is a cross-sectional view, taken on line 15—15 in FIG. 14. In this sample, the semiconductor layers 55b, 55c and the ohmic layers 57c, 57d are not self-aligned with the elongated electrode 52, but are formed by the usual photo-etching method. Therefore a positioning margin Lm1 is required. And in the step of forming the pixel electrode 58, the margin Lm2 is required while positioning this electrode 58 on the semiconductor layer 55b.

Subsequently, in the step of forming the signal line 59, the margin Lm3 is required while positioning this electrode 59 on the semiconductor layer 55c. Therefore, the width Ls1 of the elongated electrode 52 is as follows.

$$Ls1=2(Lov+Lmi+Lm2+Lm3+Lsp1)+Wsig$$

The margin Lm1 Lm2 and Lm3 are established as 3 µm and the distance Lspi as 4 µm, for instance. In this case, the width Ls1 is 39 µm. In comparison, the width of the elongated electrode 52 is about ½ in the above embodiment. Therefore it is understood that the aperture ratio can improve sharply. Moreover, short-circuits are avoided.

Figure 16:
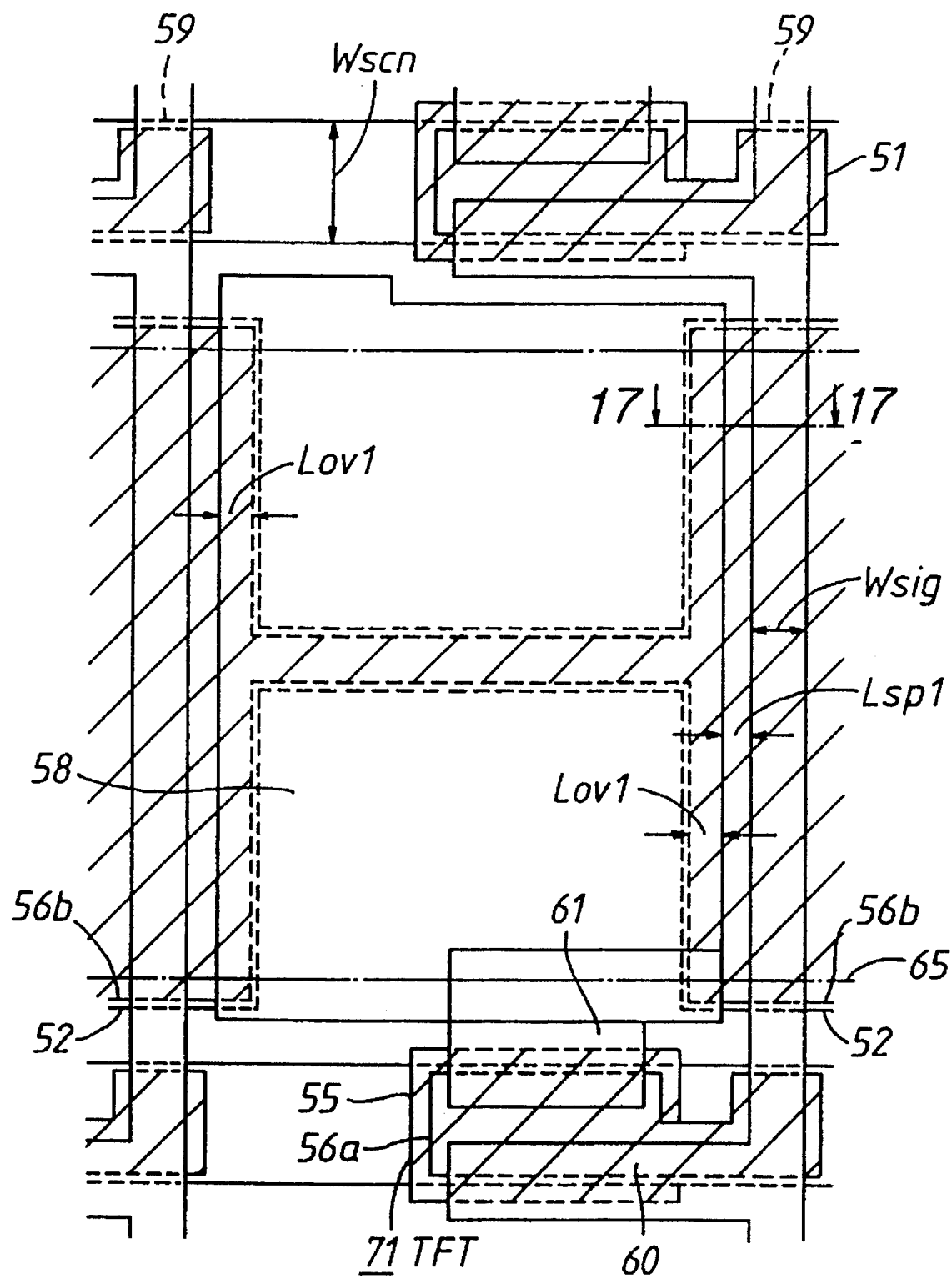
FIG. 16 shows a plan view of a pixel area of an active matrix type liquid crystal display of the fourth embodiment of this invention.

FIG. 16 indicates the fourth embodiment of this invention. As shown in FIG. 16, an insulating layer 56b can be inserted between the signal line 59 and the elongated electrode 52. Employing this structure, the probability of short-circuiting is significantly reduced. Moreover, by self-aligning this insulating layer 56b with the elongated electrode, high aperture ratio can be realized.

Figure 17:
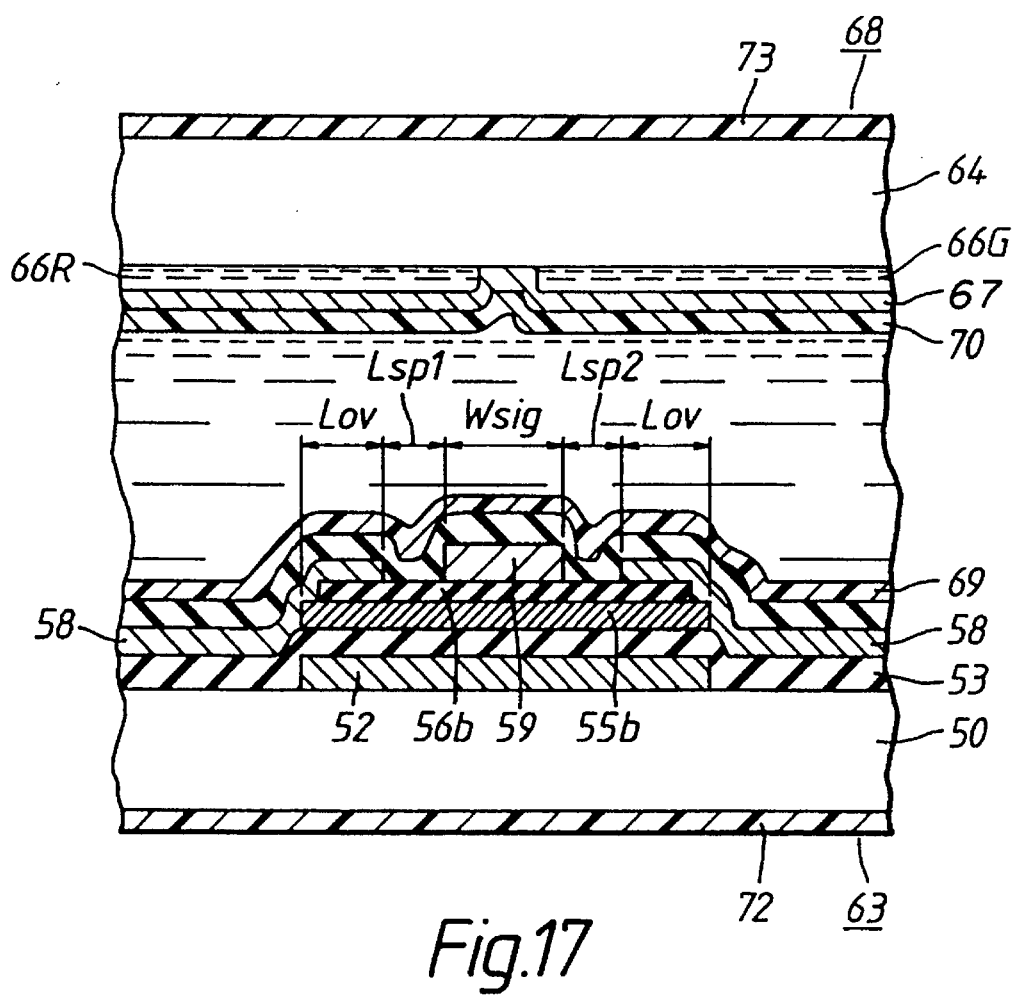
FIG. 17 is a cross-sectional view of the active matrix type liquid crystal display, taken on line 17—17 of FIG. 16.

FIG. 16 shows a plan view of a pixel region of the AM-LCD in this embodiment. FIG. 17 indicates the cross-sectional view, taken on line 17—17 shown in FIG. 16. The fundamental structure of the LCD is substantially the same as the LCD in the first embodiment.

Next, the manufacturing method of the AM-LCD in this embodiment is described.

As shown in FIG. 18 (a), the scanning lines 51, the gate electrodes, which are a part of the scanning lines 51, and the elongated electrodes 52 are formed by a photo-etching process after the deposition of a Ta film on the principal surface of the transparent substrate 50. Then a gate insulating layer 53 is formed so as to cover these electrodes.

Subsequently a i-type a-Si layer of 500 angstrom thickness and a SiNx layer of 2000 angstrom thickness are successively formed by a plasma CVD method.

After that, a positive type photo-resist 86 is formed over the whole surface, then the surface including the photoresist 86 is irradiated from the opposite surface of the substrate 50, as shown in FIG. 18 (b). And after the development of the photo-resist 86, the SiNx layer extending from the portion covered by the photo-resist 86 is removed to form the insulating layers 56a and 56b, as shown in FIG. 18(c).

Figure 18A:
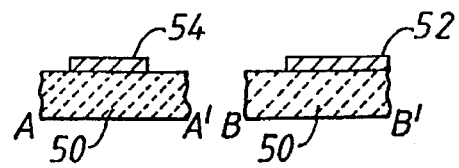
FIGS. 18(a)–18(i) are sectional views illustrating the steps in an exemplary manufacturing process for the active matrix type liquid crystal display of this invention.
Figure 18B:
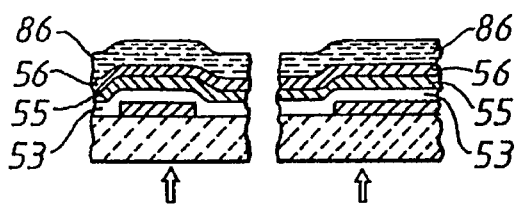
Figure 18C:
Figure 18D:
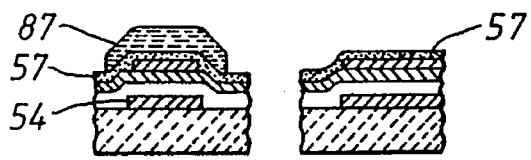
Figure 18E:
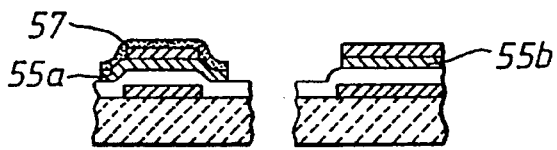

Next, an n-type a-Si layer is deposited to a 700 angstrom thickness using plasma CVD method, and subsequently, photoresist 87 is formed on the surface portion overlying the gate electrode 54, as shown in FIG. 18(d). Then using this photo-resist 87 as etching mask, the portions of the n-type a-Si layer 57 and the i-type a-Si layer extending beyond the photoresist 87 are removed, as shown in FIG. 18(e).

Figure 18F:
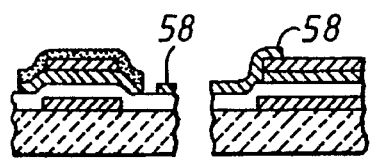
Figure 18G:
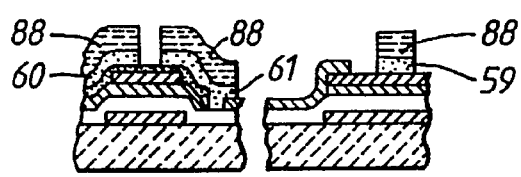

Then ITO film is deposited to a 1000 angstrom thickness using sputtering method, and this film is photo-etched in a predetermined configuration to form the pixel electrodes 58, as shown in FIG. 18(f). Next, a Mo film of 700 angstrom thickness and an Al film of 3500 angstrom thickness are successively deposited using a sputtering method. A photo-etching process of these film is carried out in a predetermined configuration, so as to form the signal lines 59, the drain electrodes 60 and the source electrodes 61, as shown in FIG. 18(g).

Figure 18H:
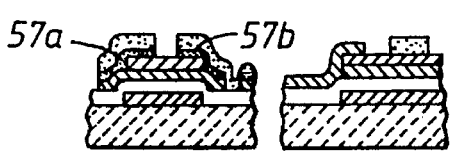
Figure 18I:
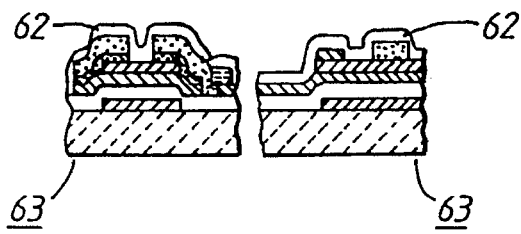

And the part of the n-type a-Si layer extending from the portion covered with these electrodes and photo-resist 88 left on these electrodes is removed, and, then the photo-resist 88 is removed, as shown in FIG. 18(h). After that, the same manufacturing process as in the above embodiment is carried out to obtain the array substrate 63 and the AM-LCD of this embodiment.

In this embodiment, the width Wscn of the scanning line 51 is 14 µm, the width of the signal line 59 is 5 µm, and the distance between the signal line 59 and the pixel electrode 58 is as 3 µm. And the overlapping length Lov of the pixel electrode 58 and the elongated electrode 52 is established as 4 µm. In this case, the width Ls2 of the elongated electrode 52 is indicated as follows.

$$Ls2=2(Lov+Lspi)+Wsig$$

Accordingly, the width Ls2 of the elongated electrode 52 is established as 19 µm.

Figure 19:
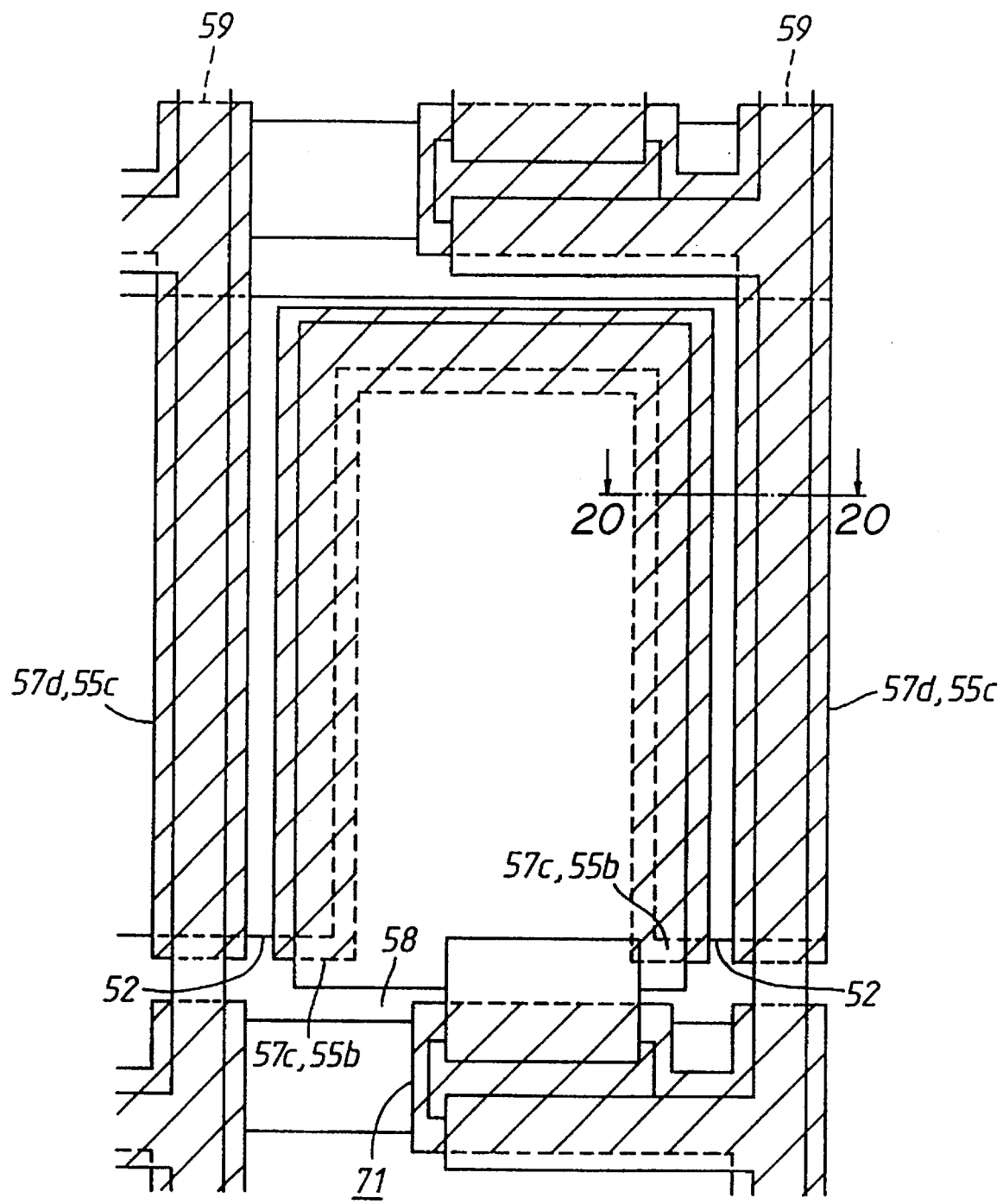
FIG. 19 shows a plan view of a pixel area of an active matrix type liquid crystal display of another example compared with this invention.
Figure 20:
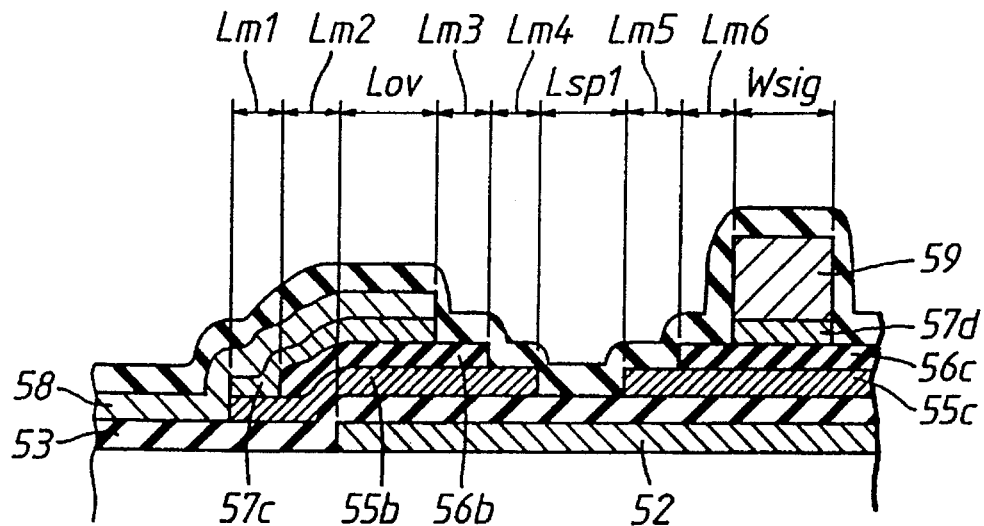
FIG. 20 shows a cross-sectional view of the active matrix type liquid crystal display, taken on line 20—20 of FIG. 19.

In comparison to this, another LCD was manufactured as shown in FIG. 19 and FIG. 20 to compare the aperture ratio of LCD with above embodiment. In this sample, the insulating layer formed on the elongated electrode is not self-aligned with the elongated electrode, but formed by the usual photo-etching method.

Therefore, in the step of forming the semiconductor layer 55b, a positioning margin (Lm1+Lm2) is required. And in the step of forming the insulating layer 56b, a positioning margin Lm1 and Lm4 is required while positioning this layer on the semiconductor layer 55b. Subsequently, in the step of forming the pixel electrode 58, positioning margin Lm3 is required while positioning this electrode on the insulating layer 56b. And in the step of forming the insulating layer 56c, positioning margin Lm5 is required to form the same on the semiconductor layer 55c. Moreover, in the step of forming the signal line 59, the margin Lm6 is required to form this electrode on the insulating layer 56c. Therefore, the width Ls1 of the elongated electrode 52 is indicated as follows.

$$Ls1=2(Lov+Lm1+Lm2+Lm3+Lm4+Lm5+Lm6+Lsp1)+Wsig$$

The margins Lmi, Lm2, Lm3, Lm4, Lm5 and Lm6 are established as 3 μm, therefore the width Ls1 is 55 μm. As compared with this, the width of the elongated electrode 52 is about ⅓ in above embodiment, therefore it is understood that the aperture ratio can improve sharply. Moreover short-circuiting was avoided.

Apart from that, the pixel electrodes neighboring each other are connected by the a-Si layers in this embodiment, as shown in FIG. 17. It is predicted that this a-Si layer will serve as a variable resistor and a short-circuit might occur between these pixel electrodes, while electric current leakage is generated in the a-Si layer.

But, in this case, the leakage between the neighboring pixel electrodes is reduced satisfactory under normal operating conditions. That is because the a-Si layer is formed thin enough to reduce the number of photo-carriers. Therefore the step of separating this a-Si layer into some island-configuration is unnecessary.

It is therefore understood that the aperture ratio can be improve sharply, and short-circuiting is avoided.

Figure 21:
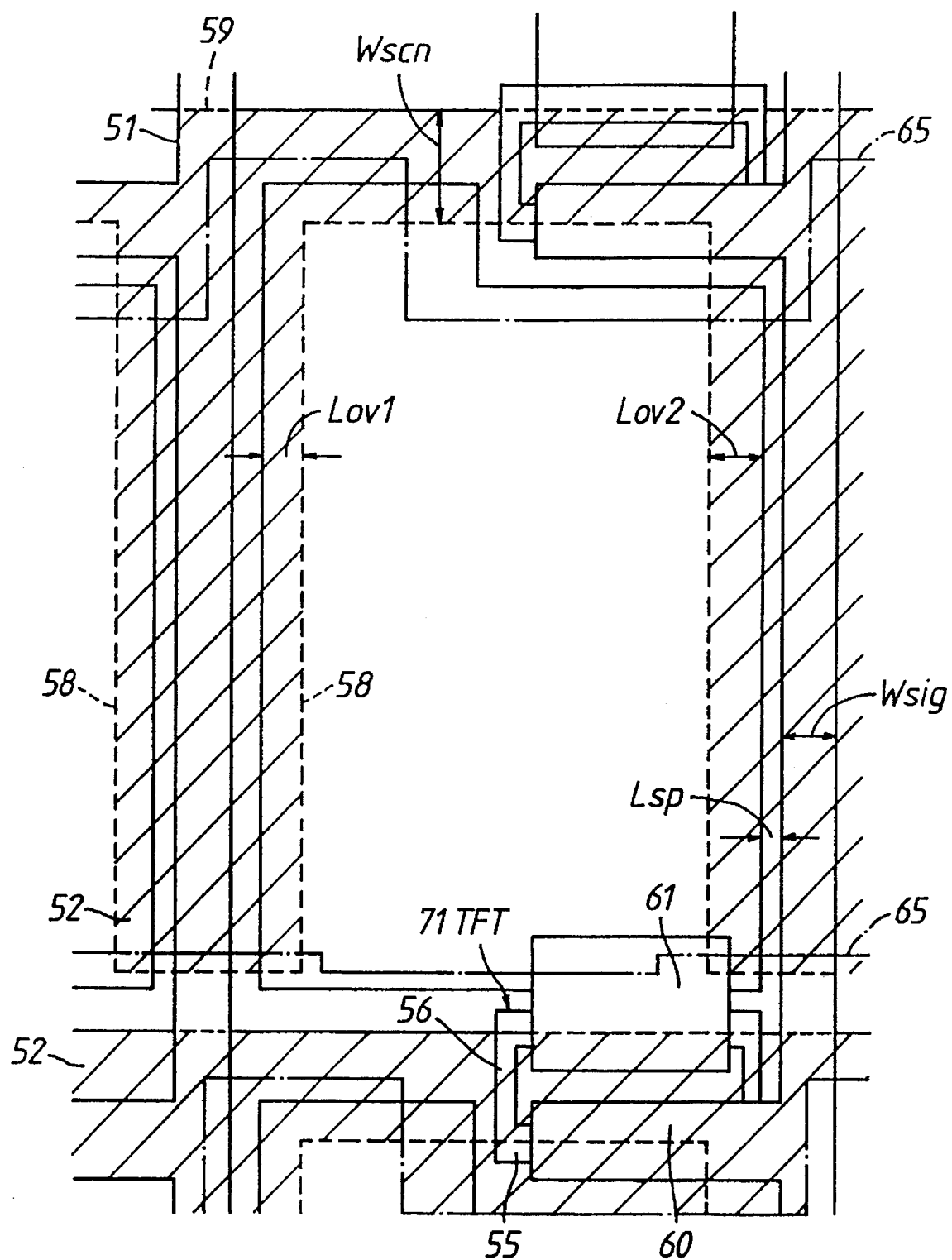
FIG. 21 is a plan view of a pixel area of an active matrix type liquid crystal display of the fifth embodiment of the present invention.

FIG. 21 shows the fifth embodiment of this invention. In this case, the configuration of the shading layer 65 formed on the counter substrate 68 is modified. That is, the elongated line 52 is extended beyond the edge of the source electrode 61 into proximity with the scanning electrode 51 of the next column, and the shading layer 65 is formed so as to shade the elongated electrode 52 and the source electrode 61.

This structure can reduce the shading area between the scanning line 51 and the pixel electrode 58 by using the source electrode 61 as a shading means, and improve the aperture ratio still more.

Moreover, an optically black stripe layer may be formed on the signal line 59 directly, with any layer inserted therebetween, or formed on the portion of the counter substrate facing to the signal line 59. The contrast can be improved sharply by sectioning the neighboring pixel area. While the width of the stripe layer is established as less than or equal to the width of the elongated electrode 52, the contrast of the display can be improved without reducing the aperture ratio.

As a stripe layer, for instance, some metallic material or oxide material, such as Cr, can be applied. Or a resin layer with black pigment or metallic filler dispersed therein is also suitable. Moreover stacked layers of above material can be employed. Also it may be suitable to overlap the neighboring color inking layer 66 and the portion of the counter substrate 68 facing to the signal line 59. By selecting anti-reflective material, the reflection of outer rays can be reduced to obtain a high contrast display.

Figure 22:
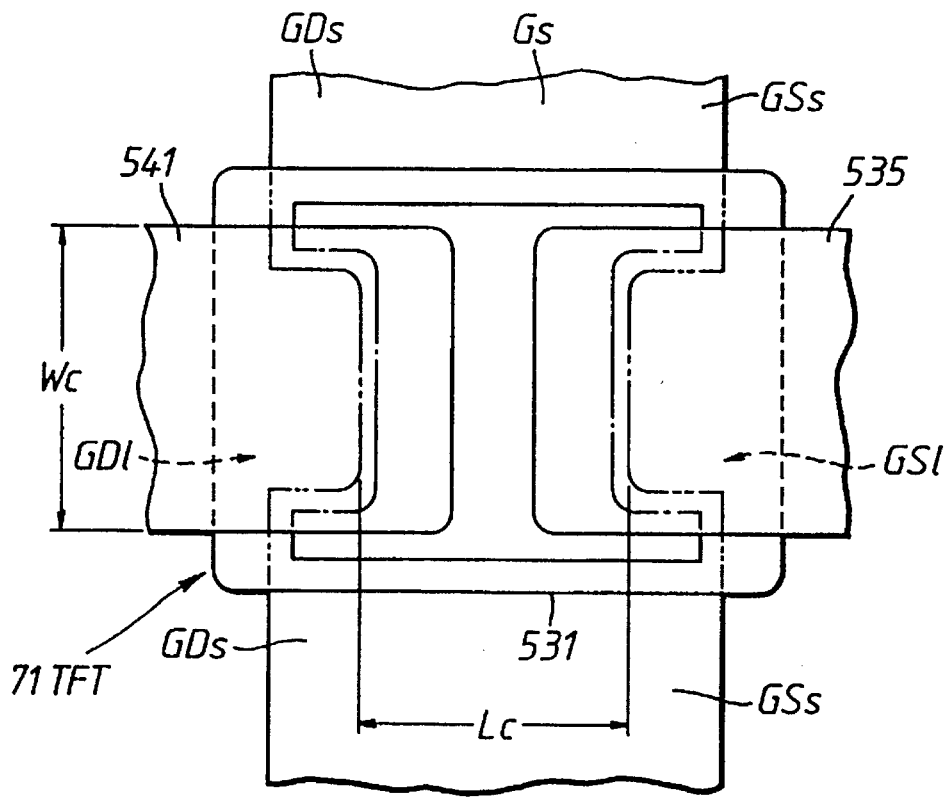
FIG. 22 shows a TFT area of an active matrix type liquid crystal display of the sixth embodiment of this invention.

FIG. 22 shows the sixth embodiment of this invention, with a modified TFT structure. This TFT 71 is characterized in that the shortest distance between an optional two points is longer than the shortest distance Lc between a predetermined two portions, wherein one of the optional points is selected from the cross-point of the outline of the gate electrode 531 and the outline of the drain electrode 541, the other of the optional points is selected from the cross-point of the outline of the gate electrode 531 and the outline of the source electrode 535, and one of the predetermined portions is established as the portion of the outline of the gate electrode 531 overlapped with the drain electrode 541, and the other is established as the portion of the outline of the gate electrode 531 overlapped with the source electrode 535.

The photo-leakage of the TFT is generated much more along the edge of the channel region along its length direction (side channel). It is considered that, at the center portion of the channel region (main channel), photo-carriers are scarcely generated, because there is a portion shaded by the gate electrode and the source electrode or the drain electrode in this region, but no shading portion is disposed above the side channel region.

Therefore, the structure of the TFT 71 shown in FIG. 19 is applied to lengthen the side channel (between the cross-point of the outline of the gate electrode 531 with the outline of the drain electrode 541 and the cross-point of the outline of the gate electrode 531 with the outline of the source electrode 535) rather than the main channel (between the portion of the outline of the gate electrode 531 overlapped with the drain electrode 541 and the portion of the outline of the gate electrode 531 overlapped with the source electrode 535), so that a shading portion is disposed for the side channel region, in order to reduce the generation of photo-carriers and the leakage current during the holding interval.

By virtue of this invention embodiment, the area of the storage capacitor Cs, which is required to hold the pixel electrode voltage, can be reduced. Therefore the aperture ratio is further improved because the area of the overlapping portion between the elongated electrode 52 and the pixel electrode 58 can also be reduced.

What is claimed is:

1. A method of manufacturing an active matrix type display device, comprising the steps of:

forming a plurality of scanning lines and elongated electrodes on one face of a insulating substrate;

forming a gate insulating layer over the scanning lines and the elongated electrodes;

forming a semiconductor layer on the gate insulating layer;

forming a passivation layer on the semiconductor layer;

forming a photo-resist over the insulating layer;

irradiating the photo-resist from an opposite face of the substrate to expose the photo-resist in area exclusive of alignment with the scanning lines and the elongated electrodes;

patterning the semiconductor layer using the photo-resist as a patterning mask;

forming a plurality of pixel electrodes with portions overlapping the elongated electrodes;

forming a plurality of signal lines in overlapping relation with the elongated electrodes; and patterning the semiconductor layer to remove portions thereof using the signal lines and the pixel electrodes as a patterning mask.

2. A method of manufacturing an active matrix type display device, comprising the steps of:

forming a plurality of scanning lines and elongated electrodes on one surface of a insulating substrate;

forming a gate insulating layer over the scanning lines and the elongated electrodes;

forming a semiconductor layer on the gate insulating layer;

forming a insulating layer over the semiconductor layer;

forming a photo-resist over the insulating layer;

irradiating the photo-resist from an opposite surface of the substrate to expose the photo-resist exclusive of alignment with the scanning lines and the elongated electrodes;

patterning the insulating layer using the photo-resist as a patterning mask;

forming another photo-resist over the insulating layer;

exposing the another photo-resist;

patterning the semiconductor layer using said another photo-resist as a patterning mask;

forming a plurality of pixel electrode having portions overlapping the elongated electrodes; and forming a plurality of signal lines in overlapping relation with the elongated electrodes.

3. An active matrix type display device comprising;

a plurality of scanning lines disposed on an insulating substrate;

a plurality of signal lines disposed on the insulating substrate and crossing the scanning lines;

a gate insulating layer interposed between each of the scanning lines and the signal lines at the crossings thereof;

a plurality of thin film transistors, each having a semiconductor layer disposed on the gate insulating layer;

a plurality of capacity actuation type pixels respectively disposed adjacent the crossings of the scanning lines and the signal lines, wherein each pixel has a pixel electrode electrically coupled with one of the signal lines through one of the thin film transistors;

a plurality of elongated electrodes respectively underlying the signal lines, wherein the elongated electrodes are wider than the signal lines and are overlapped by the signal lines through a dielectric layer composed of the gate insulating layer and the semiconductor layer, the semiconductor layer having opposed side edges located in spaces between corresponding side edges of the signal lines and edges of adjacent pairs of the pixel electrodes; and a plurality of storage capacitors respectively electrically coupled with the capacity actuation type pixels, wherein each storage capacitor has a first electrode as a part of one of the pixel electrodes and second electrode as a part of one of the elongated electrodes.

4. An active matrix type display device according to claim 3, further including a passivation layer on the semiconductor layer of the thin film transistor, and an insulator composed of the same layer as the passivation layer between overlapping portions of the signal lines with the elongated electrodes.

5. An active matrix type display device according to claim 4, wherein the gate insulating layer disposed between each elongated electrode and each signal line is substantially aligned with a side edge of each elongated electrode.

6. An active matrix type display device according to claim 3, wherein an edge portion of each pixel electrode is respectively overlapped with an extending part of the overlapping portion of each elongated electrode.

7. An active matrix type display device according to claim 6, wherein a number of the layers interposed between each pixel electrode and each elongated electrode is less than a number of the layers interposed between each signal line and each elongated electrode.

8. An active matrix type display device according to claim 6, wherein each pixel electrode is located on the gate insulating layer.

9. An active matrix type display device according to claim 6, wherein each elongated electrode serves as a pixel shading member.

10. An active matrix type display device according to claim 9, further including a stripe layer serving as a shading member that is disposed between an adjacent two of the pixel electrodes overlapped with one of the scanning lines.

11. An active matrix type display device according to claim 10, wherein the stripe layer is disposed over another insulating substrate facing the insulating substrate.

12. An active matrix type display device according to claim 11, further including a color inking layer formed over a region sectioned by the stripe layer.

13. An active matrix type display device according to claim 3, wherein each capacity actuation type pixel is a liquid crystal pixel.

14. An active matrix type display device according to claim 3, wherein each elongated electrode is extended from a respective one of the scanning lines.

15. An active matrix type display device according to claim 14, wherein one of the elongated electrodes is electrically coupled with an Nth one of the scanning lines, and one of the pixel electrodes overlapped with the one elongated electrode being electrically coupled with one of the thin film transistors that is electrically coupled with an (N+1)th one of the scanning lines through the gate electrode of one of the thin film transistors.

16. An active matrix type display device according to claim 3, wherein each thin film transistor includes a channel region respective located within an outline of one of the scanning lines.

17. An active matrix type display device according to claim 16, wherein a width of each elongated electrode is wider than a width of each scanning line.

18. An active matrix type display device according to claim 3, wherein each thin film transistor includes a drain electrode electrically coupled with a respective one of the signal lines, a gate electrode, a source electrode electrically coupled with one of the pixel electrodes, and a channel region having a length established as the distance between an overlapping portion of the drain electrode with the gate electrode and an overlapping portion of the source electrode with the gate electrode.

19. An active matrix type display device according to claim 3, wherein each thin film transistor includes a gate electrode electrically coupled with one of the scanning lines, a drain electrode, and a source electrode overlapped with the gate electrode through the gate insulating layer and the semiconductor layer, and a shortest distance between a crossing point of an outline of the gate electrode with an outline of the drain electrode and a crossing point of the outline of the gate electrode with an outline of the source electrode is longer than a shortest distance between a portion of the outline of the gate electrode overlapped with the drain electrode and a portion of the outline of the gate electrode overlapped with the source electrode.

20. An active matrix type display device according to claim 3, wherein each elongated electrode has portions overlapping the pixel electrodes of adjacent pixels, the overlapping portions being of substantially equal length.

21. An active matrix type display device according to claim 3, wherein one of the thin film transistors include a gate electrode electrically coupled with an Nth one of the scanning lines, a drain electrode electrically coupled with one of the signal lines and a source electrode electrically coupled with one of the pixel electrodes, and one of the elongated electrodes extends beyond a nearest outline of the source electrode according to an (N−1)th one of the scanning lines.

22. An active matrix type display device according to claim 3, further including an optically black stripe layer covering each signal line, a width of the stripe layer being equal to or narrower than a width of each elongated electrode.

23. An active matrix type display device according to claim 3, wherein the semiconductor layer disposed between each elongated electrode and each signal line is substantially aligned with a side edge of each elongated electrode.

* * * * *

UNITED STATES PATENT AND TRADEMARK OFFICE
CERTIFICATE OF CORRECTION

PATENT NO. : 5,610,736
DATED : March 11, 1997
INVENTOR(S) : Yoshihiro Asai

It is certified that error appears in the above-indentified patent and that said Letters Patent is hereby corrected as shown below:

On the Title page, item [57], in the Abstract, line 5,
"a enlongated" should read --an elongated--;

line 11, "a electrode" should read --an electrode--.

Claim 1, column 14, line 27, "a insulating" should read --an insulating--.

Claim 2, column 14, line 52, "a insulating" should read --an insulating--.

Claim 2, column 14, line 58, " a insulating" should read --an insulating--.

Claim 2, column 15, line 4, "electrode" should read --electrodes--.

UNITED STATES PATENT AND TRADEMARK OFFICE
CERTIFICATE OF CORRECTION

PATENT NO. : 5,610,736
DATED : March 11, 1997
INVENTOR(S) : Yoshihiro Asai

It is certified that error appears in the above-indentified patent and that said Letters Patent is hereby corrected as shown below:

Claim 16, column 16, line 19, "respective" should read --respectively--.

Signed and Sealed this

Eighteenth Day of November 1997

Attest:

BRUCE LEHMAN

*Attesting Officer*   Commissioner of Patents and Trademarks